United States Patent
Nukushina et al.

(10) Patent No.: US 11,285,759 B2
(45) Date of Patent: Mar. 29, 2022

(54) PNEUMATIC TIRE

(71) Applicant: The Yokohama Rubber Co., LTD., Tokyo (JP)

(72) Inventors: Ryosuke Nukushina, Hiratsuka (JP); Isamu Kishizoe, Hiratsuka (JP)

(73) Assignee: The Yokohama Rubber Co., LTD.

( * ) Notice: Subject to any disclaimer, the term of this patent is extended or adjusted under 35 U.S.C. 154(b) by 254 days.

(21) Appl. No.: 16/467,481

(22) PCT Filed: Jul. 21, 2017

(86) PCT No.: PCT/JP2017/026577
§ 371 (c)(1),
(2) Date: Jun. 6, 2019

(87) PCT Pub. No.: WO2018/116512
PCT Pub. Date: Jun. 28, 2018

(65) Prior Publication Data
US 2019/0322140 A1    Oct. 24, 2019

(30) Foreign Application Priority Data

Dec. 22, 2016    (JP) .............................. JP2016-248613

(51) Int. Cl.
*B60C 11/03*    (2006.01)
*B60C 11/24*    (2006.01)
*B60C 11/12*    (2006.01)

(52) U.S. Cl.
CPC ............ *B60C 11/03* (2013.01); *B60C 11/033* (2013.01); *B60C 11/0304* (2013.01);
(Continued)

(58) Field of Classification Search
CPC ........... B60C 2011/0355; B60C 11/304; B60C 11/033

See application file for complete search history.

(56) References Cited

U.S. PATENT DOCUMENTS 4,429,728 A * 2/1984 Ippen ...................... B60C 11/00
                                                        152/209.18
2003/0226629 A1* 12/2003 Kimishima ......... B60C 11/0306
                                                        152/209.18

(Continued)

FOREIGN PATENT DOCUMENTS

CN        103029526       4/2013
CN        104203603       12/2014

(Continued)

OTHER PUBLICATIONS

European Search Report for European Application No. 17884375.1 dated Jul. 6, 2020, 8 pages, Germany.

(Continued)

*Primary Examiner* — Timothy Kennedy
*Assistant Examiner* — Farah Taufiq
(74) *Attorney, Agent, or Firm* — Thorpe North & Western

(57) ABSTRACT

In a pneumatic tire, one end of a first lug groove opens to an edge of an inner second land on the ground contact edge side, and at the other end terminates within the inner second land. One end of the second lug groove opens to the edge of the inner second land on a equatorial plane edge side, and the other end terminates within the inner second land. The first and second lug grooves are alternately arranged in the circumferential direction. In a region on the outer side in the width direction, a circumferential main groove on the equatorial plane side defining the outer second land has a bent shape with an amplitude in a lateral direction, and includes an acute angle bend bending at an edge on the equatorial plane side. The outside second land includes a lug groove opening to a position facing the bend.

18 Claims, 14 Drawing Sheets

(52) U.S. Cl.
CPC ....... *B60C 11/24* (2013.01); *B60C 2011/0355* (2013.01); *B60C 2011/1268* (2013.01)

(56) References Cited

U.S. PATENT DOCUMENTS

| | | | |
|---|---|---|---|
| 2011/0220259 A1* | 9/2011 | Suzuki | B60C 11/0083 152/209.18 |
| 2012/0285591 A1* | 11/2012 | Nagayasu | B60C 11/0304 152/209.8 |
| 2013/0087261 A1 | 4/2013 | Kageyama | |
| 2013/0118663 A1* | 5/2013 | Kishizoe | B60C 11/1218 152/209.18 |
| 2013/0146192 A1* | 6/2013 | Miyoshi | B60C 11/0302 152/209.25 |
| 2014/0014246 A1 | 1/2014 | Fujita | |
| 2015/0041034 A1* | 2/2015 | Matsushita | B60C 11/04 152/209.24 |
| 2016/0144666 A1* | 5/2016 | Yoshida | B60C 11/1259 152/209.24 |
| 2016/0152092 A1* | 6/2016 | Sasaki | B60C 11/0304 152/209.18 |
| 2017/0368883 A1* | 12/2017 | Kigami | B60C 11/0306 |
| 2018/0079260 A1 | 3/2018 | Rubber | |

FOREIGN PATENT DOCUMENTS

| | | |
|---|---|---|
| JP | 2004-017739 | 1/2004 |
| JP | 3682269 | 8/2005 |
| JP | 2009-161112 | 7/2009 |
| JP | 2012-236510 | 12/2012 |
| JP | 2013-082308 | 5/2013 |
| JP | 2015-020465 | 2/2015 |
| JP | 5686955 | 3/2015 |
| JP | 2015-074289 | 4/2015 |
| JP | 2015074289 A * | 4/2015 |
| JP | 2015-131642 | 7/2015 |
| JP | 2015-134576 | 7/2015 |
| JP | 5770834 | 8/2015 |
| JP | 2015-229461 | 12/2015 |
| JP | 2016-199168 | 12/2016 |
| WO | WO 2009/038131 | 3/2009 |
| WO | WO 2012/133334 | 10/2012 |
| WO | WO 2013/136947 | 9/2013 |
| WO | WO 2015/008659 | 1/2015 |
| WO | WO 2015/186481 | 12/2015 |
| WO | WO 2016/163207 | 10/2016 |

OTHER PUBLICATIONS

International Search Report for International Application No. PCT/JP2017/026577 dated Sep. 19, 2017, 7 pages, Japan.

* cited by examiner

|  |  | CONVENTIONAL EXAMPLE | EXAMPLE 1 | EXAMPLE 2 | EXAMPLE 3 | EXAMPLE 4 | EXAMPLE 5 | EXAMPLE 6 | EXAMPLE 7 | EXAMPLE 8 |
|---|---|---|---|---|---|---|---|---|---|---|
|  | N1/Nsh (NUMBER OF GROOVES) | 56/56 | 112/56 | 112/56 | 112/56 | 112/56 | 112/56 | 112/56 | 112/56 | 112/56 |
| INNER SIDE REGION | FIRST LUG GROOVE OF SECOND LAND PORTION | NOT EXTENDING THROUGH ON ONE SIDE | NOT EXTENDING THROUGH ON ONE SIDE | NOT EXTENDING THROUGH ON ONE SIDE | NOT EXTENDING THROUGH ON ONE SIDE | NOT EXTENDING THROUGH ON ONE SIDE | NOT EXTENDING THROUGH ON ONE SIDE | NOT EXTENDING THROUGH ON ONE SIDE | NOT EXTENDING THROUGH ON ONE SIDE | NOT EXTENDING THROUGH ON ONE SIDE |
|  | SECOND LUG GROOVE OF SECOND LAND PORTION | EXTENDS THROUGH | NOT EXTENDING THROUGH ON ONE SIDE | NOT EXTENDING THROUGH ON ONE SIDE | NOT EXTENDING THROUGH ON ONE SIDE | NOT EXTENDING THROUGH ON ONE SIDE | NOT EXTENDING THROUGH ON ONE SIDE | NOT EXTENDING THROUGH ON ONE SIDE | NOT EXTENDING THROUGH ON ONE SIDE | NOT EXTENDING THROUGH ON ONE SIDE |
|  | INCLINATION DIRECTION OF LUG GROOVES A, B | SAME DIRECTION | OPPOSITE DIRECTION | OPPOSITE DIRECTION | OPPOSITE DIRECTION | OPPOSITE DIRECTION | OPPOSITE DIRECTION | OPPOSITE DIRECTION | OPPOSITE DIRECTION | OPPOSITE DIRECTION |
|  | θ (°) | 70 | 70 | 70 | 70 | 65 | 65 | 65 | 65 | 65 |
|  | NARROW PORTION OF LUG GROOVE | NO | NO | YES | YES | YES | YES | YES | YES | YES |
|  | Wg2/Wg1 | 1.00 | 1.00 | 0.30 | 0.30 | 0.30 | 0.30 | 0.30 | 0.30 | 0.30 |
|  | D2/Wb2 | - | - | 0.30 | 0.30 | 0.30 | 0.30 | 0.30 | 0.30 | 0.30 |
|  | D1/Wb1 | 0.30 | 0.30 | 0.30 | 0.50 | 0.50 | 0.50 | 0.50 | 0.50 | 0.50 |
|  | BENT PORTION OF OUTER CIRCUMFERENTIAL MAIN GROOVE PRESENT? | NO | YES | YES | YES | YES | YES | YES | YES | YES |
| OUTER SIDE REGION | THREE-WAY INTERSECTION POINT PC PRESENT? | NO | YES | YES | YES | YES | YES | YES | YES | YES |
|  | γ (°) | 0 | 65 | 65 | 65 | 65 | 65 | 65 | 65 | 65 |
|  | Hn (mm) | 9.0 | 9.0 | 8.0 | 7.0 | 9.0 | 9.0 | 9.0 | 9.0 | 9.0 |
|  | Wn (mm) | 5.0 | 5.0 | 4.0 | 5.0 | 5.0 | 5.0 | 5.0 | 5.0 | 5.0 |
|  | THREE-WAY INTERSECTION POINT PC AND FOUR-WAY INTERSECTION POINT PD ARRANGEMENT | THREE-WAY ONLY | ALTERNATE | ALTERNATE | ALTERNATE | ALTERNATE | ALTERNATE | ALTERNATE | ALTERNATE | ALTERNATE |
|  | STlin - STlout | 0 | 0 | 0 | 0 | 0 | 3 | 3 | 3 | 3 |
| TREAD | δ_in/δ_out | 1.00 | 1.00 | 1.00 | 1.00 | 1.00 | 1.00 | 1.20 | 1.20 | 1.20 |
|  | Aout-Ain (%) | 0 | 0 | 0 | 0 | 0 | 0 | 0 | 0 | 0 |
| CHARACTERISTIC | Hs - Hd (mm) | NONE | 1.0 | 1.0 | 1.0 | 1.0 | 1.0 | 1.0 | 1.0 | 4.0 |
|  | BRAKING PERFORMANCE ON ICE | 100 | 110 | 115 | 120 | 118 | 122 | 124 | 128 | 130 |
|  | TURNING PERFORMANCE ON ICE | 100 | 107 | 112 | 115 | 118 | 121 | 125 | 128 | 129 |
|  | BRAKING PERFORMANCE ON SNOW | 100 | 113 | 110 | 110 | 113 | 115 | 118 | 120 | 120 |
|  | STEERING STABILITY PERFORMANCE ON SNOW | 100 | 105 | 105 | 105 | 105 | 107 | 110 | 112 | 112 |

FIG. 11

| | | CONVENTIONAL EXAMPLE | EXAMPLE 1 | EXAMPLE 2 |
|---|---|---|---|---|
| INNER SIDE REGION | N1/Nsh (NUMBER OF GROOVES) | 56/56 | 112/56 | 112/56 |
| | FIRST LUG GROOVE OF SECOND LAND PORTION | NOT EXTENDING THROUGH ON ONE SIDE | NOT EXTENDING THROUGH ON ONE SIDE | NOT EXTENDING THROUGH ON ONE SIDE |
| | SECOND LUG GROOVE OF SECOND LAND PORTION | EXTENDS THROUGH | NOT EXTENDING THROUGH ON ONE SIDE | NOT EXTENDING THROUGH ON ONE SIDE |
| | INCLINATION DIRECTION OF LUG GROOVES A, B | SAME DIRECTION | OPPOSITE DIRECTION | OPPOSITE DIRECTION |
| | θ (°) | 70 | 70 | 70 |
| | NARROW PORTION OF LUG GROOVE | NO | NO | YES |
| | Wg2/Wg1 | 1.00 | 1.00 | 0.30 |
| | D2/Wb2 | - | - | 0.30 |
| | D1/Wb1 | 0.30 | 0.30 | 0.30 |
| OUTER SIDE REGION | BENT PORTION OF OUTER CIRCUMFERENTIAL MAIN GROOVE PRESENT? | NO | YES | YES |
| | THREE-WAY INTERSECTION POINT PC PRESENT? | NO | YES | YES |
| | γ (°) | 0 | 65 | 65 |
| | Hn (mm) | 9.0 | 9.0 | 8.0 |
| | Wn (mm) | 5.0 | 5.0 | 4.0 |
| | THREE-WAY INTERSECTION POINT PC AND FOUR-WAY INTERSECTION POINT PD ARRANGEMENT | THREE-WAY ONLY | ALTERNATE | ALTERNATE |
| TREAD CHARACTERISTIC | STIin - STIout | 0 | 0 | 0 |
| | δ_in/δ_out | 1.00 | 1.00 | 1.00 |
| | Aout-Ain (%) | 0 | 0 | 0 |
| | Hs - Hd (mm) | NONE | 1.0 | 1.0 |
| | BRAKING PERFORMANCE ON ICE | 100 | 110 | 115 |
| | TURNING PERFORMANCE ON ICE | 100 | 107 | 112 |
| | BRAKING PERFORMANCE ON SNOW | 100 | 113 | 110 |
| | STEERING STABILITY PERFORMANCE ON SNOW | 100 | 105 | 105 |

FIG. 11A

|  |  | EXAMPLE 3 | EXAMPLE 4 | EXAMPLE 5 |
|---|---|---|---|---|
| INNER SIDE REGION | N1/Nsh (NUMBER OF GROOVES) | 112/56 | 112/56 | 112/56 |
|  | FIRST LUG GROOVE OF SECOND LAND PORTION | NOT EXTENDING THROUGH ON ONE SIDE | NOT EXTENDING THROUGH ON ONE SIDE | NOT EXTENDING THROUGH ON ONE SIDE |
|  | SECOND LUG GROOVE OF SECOND LAND PORTION | NOT EXTENDING THROUGH ON ONE SIDE | NOT EXTENDING THROUGH ON ONE SIDE | NOT EXTENDING THROUGH ON ONE SIDE |
|  | INCLINATION DIRECTION OF LUG GROOVES A, B | OPPOSITE DIRECTION | OPPOSITE DIRECTION | OPPOSITE DIRECTION |
|  | $\theta$ (°) | 70 | 65 | 65 |
|  | NARROW PORTION OF LUG GROOVE | YES | YES | YES |
|  | Wg2/Wg1 | 0.30 | 0.30 | 0.30 |
|  | D2/Wb2 | 0.30 | 0.30 | 0.30 |
|  | D1/Wb1 | 0.50 | 0.50 | 0.50 |
| OUTER SIDE REGION | BENT PORTION OF OUTER CIRCUMFERENTIAL MAIN GROOVE PRESENT? | YES | YES | YES |
|  | THREE-WAY INTERSECTION POINT PC PRESENT? | YES | YES | YES |
|  | $\gamma$ (°) | 65 | 65 | 65 |
|  | Hn (mm) | 7.0 | 9.0 | 9.0 |
|  | Wn (mm) | 5.0 | 5.0 | 5.0 |
|  | THREE-WAY INTERSECTION POINT PC AND FOUR-WAY INTERSECTION POINT PD ARRANGEMENT | ALTERNATE | ALTERNATE | ALTERNATE |
| TREAD CHARACTERISTIC | STIin - STIout | 0 | 0 | 3 |
|  | $\delta\_in/\delta\_out$ | 1.00 | 1.00 | 1.00 |
|  | Aout-Ain (%) | 0 | 0 | 0 |
|  | Hs - Hd (mm) | 1.0 | 1.0 | 1.0 |
|  | BRAKING PERFORMANCE ON ICE | 120 | 118 | 122 |
|  | TURNING PERFORMANCE ON ICE | 115 | 118 | 121 |
|  | BRAKING PERFORMANCE ON SNOW | 110 | 113 | 115 |
|  | STEERING STABILITY PERFORMANCE ON SNOW | 105 | 105 | 107 |

FIG. 11B

| | | EXAMPLE 6 | EXAMPLE 7 | EXAMPLE 8 |
|---|---|---|---|---|
| INNER SIDE REGION | N1/Nsh (NUMBER OF GROOVES) | 112/56 | 112/56 | 112/56 |
| | FIRST LUG GROOVE OF SECOND LAND PORTION | NOT EXTENDING THROUGH ON ONE SIDE | NOT EXTENDING THROUGH ON ONE SIDE | NOT EXTENDING THROUGH ON ONE SIDE |
| | SECOND LUG GROOVE OF SECOND LAND PORTION | NOT EXTENDING THROUGH ON ONE SIDE | NOT EXTENDING THROUGH ON ONE SIDE | NOT EXTENDING THROUGH ON ONE SIDE |
| | INCLINATION DIRECTION OF LUG GROOVES A, B | OPPOSITE DIRECTION | OPPOSITE DIRECTION | OPPOSITE DIRECTION |
| | $\theta$ (°) | 65 | 65 | 65 |
| | NARROW PORTION OF LUG GROOVE | YES | YES | YES |
| | Wg2/Wg1 | 0.30 | 0.30 | 0.30 |
| | D2/Wb2 | 0.30 | 0.30 | 0.30 |
| | D1/Wb1 | 0.50 | 0.50 | 0.50 |
| OUTER SIDE REGION | BENT PORTION OF OUTER CIRCUMFERENTIAL MAIN GROOVE PRESENT? | YES | YES | YES |
| | THREE-WAY INTERSECTION POINT PC PRESENT? | YES | YES | YES |
| | $\gamma$ (°) | 65 | 65 | 65 |
| | Hn (mm) | 9.0 | 9.0 | 9.0 |
| | Wn (mm) | 5.0 | 5.0 | 5.0 |
| | THREE-WAY INTERSECTION POINT PC AND FOUR-WAY INTERSECTION POINT PD ARRANGEMENT | ALTERNATE | ALTERNATE | ALTERNATE |
| TREAD CHARACTERISTIC | STIin - STIout | 3 | 3 | 3 |
| | $\delta\_in/\delta\_out$ | 1.20 | 1.20 | 1.20 |
| | Aout-Ain (%) | 0 | 4.0 | 4.0 |
| | Hs - Hd (mm) | 1.0 | 1.0 | 2.0 |
| | BRAKING PERFORMANCE ON ICE | 124 | 128 | 130 |
| | TURNING PERFORMANCE ON ICE | 125 | 128 | 129 |
| | BRAKING PERFORMANCE ON SNOW | 118 | 120 | 120 |
| | STEERING STABILITY PERFORMANCE ON SNOW | 110 | 112 | 112 |

FIG. 11C

PNEUMATIC TIRE

TECHNICAL FIELD

The technology relates to a pneumatic tire and particularly relates to a pneumatic tire that can provide performance on snow and performance on ice in a compatible manner.

BACKGROUND ART

Performance on snow and performance on ice are required for studless tires. In the related art of studded tires, the technologies described in Japan Patent Nos. 3682269, 5686955, and 5770834 as well as Japan Unexamined Patent Publication Nos. 2015-074289, 2015-020465 and 2015-229461 are known.

SUMMARY

The technology provides a pneumatic tire that can provide performance on snow and performance on ice in a compatible manner.

A pneumatic tire according to an embodiment of the technology comprises:

four or more circumferential main grooves extending in a tire circumferential direction; and five or more land portions defined by the circumferential main grooves; wherein left and right circumferential main grooves of the circumferential main grooves located at an outermost side in a tire lateral direction are defined as outermost circumferential main grooves, left and right land portions of the land portions located on a tire equatorial plane side and defined by the outermost circumferential main grooves are defined as second land portions;

one of the second land portions comprises a circumferential narrow groove extending in the tire circumferential direction and a plurality of sets of first lug grooves and second lug grooves extending in the tire lateral direction and extending through the circumferential narrow groove;

one end portion of the first lug groove opens to one edge portion of the one second land portion, and an other end portion terminates within the one second land portion;

one end of the second lug groove opens to an other edge portion of the one second land portion, and an other end terminates within the one second land portion;

the first lug groove and the second lug groove are alternately arranged in the tire circumferential direction;

the circumferential main grooves on a tire equatorial plane side defining the other second land portion have a bent shape with an amplitude in the tire lateral direction and comprise a bent portion with an acute angle of bending at an edge portion on a tire equatorial plane side; and the other second land portion comprises a lug groove opening to a position facing the bent portion.

In the pneumatic tire according to an embodiment of the present technology, and in the vehicle width direction inner region, due to the first lug grooves and the second lug grooves of the inner second land portion extending in the tire lateral direction and extending through the circumferential narrow grooves, respectively opening to circumferential main grooves, a greater number of groove intersection portions are provided increasing the groove volume, enhancing the snow column shearing force and snow discharge properties on snow-covered road surfaces accordingly. Further, since the other end portion of the first lug groove and the other end portion of the second lug groove terminate in the land portion, the ground contact area of the land portion is ensured and the adhesion frictional force on the icy road surface is ensured. Such a configuration is advantageous in that performance on snow and performance on ice of tire are achieved in a compatible manner. Further, in the vehicle width direction outer region, since the circumferential main groove includes the bent portion at the edge portion on the tire equatorial plane side, and the outer second land portion includes the lug groove that opens to the position facing the bent portion, the groove volume of the circumferential main groove at the crossing position with the groove is increased. Thus, the shearing effect in the snow of the vehicle width direction outer region is improved, which has the advantage that the snow performance of the tire is improved.

BRIEF DESCRIPTION OF DRAWINGS

FIGS. 11A-11C include a table illustrating the results of performance tests of pneumatic tires according to embodiments of the technology.

DETAILED DESCRIPTION

Embodiments of the technology are described in detail below with reference to the drawings. However, the technology is not limited to these embodiments. Moreover, constituents of the embodiments include elements that are substitutable while maintaining consistency with the technology, and obviously substitutable elements. Furthermore, the modified examples described in the embodiments can be combined as desired within the scope apparent to one skilled in the art.

Pneumatic Tire

Figure 1:
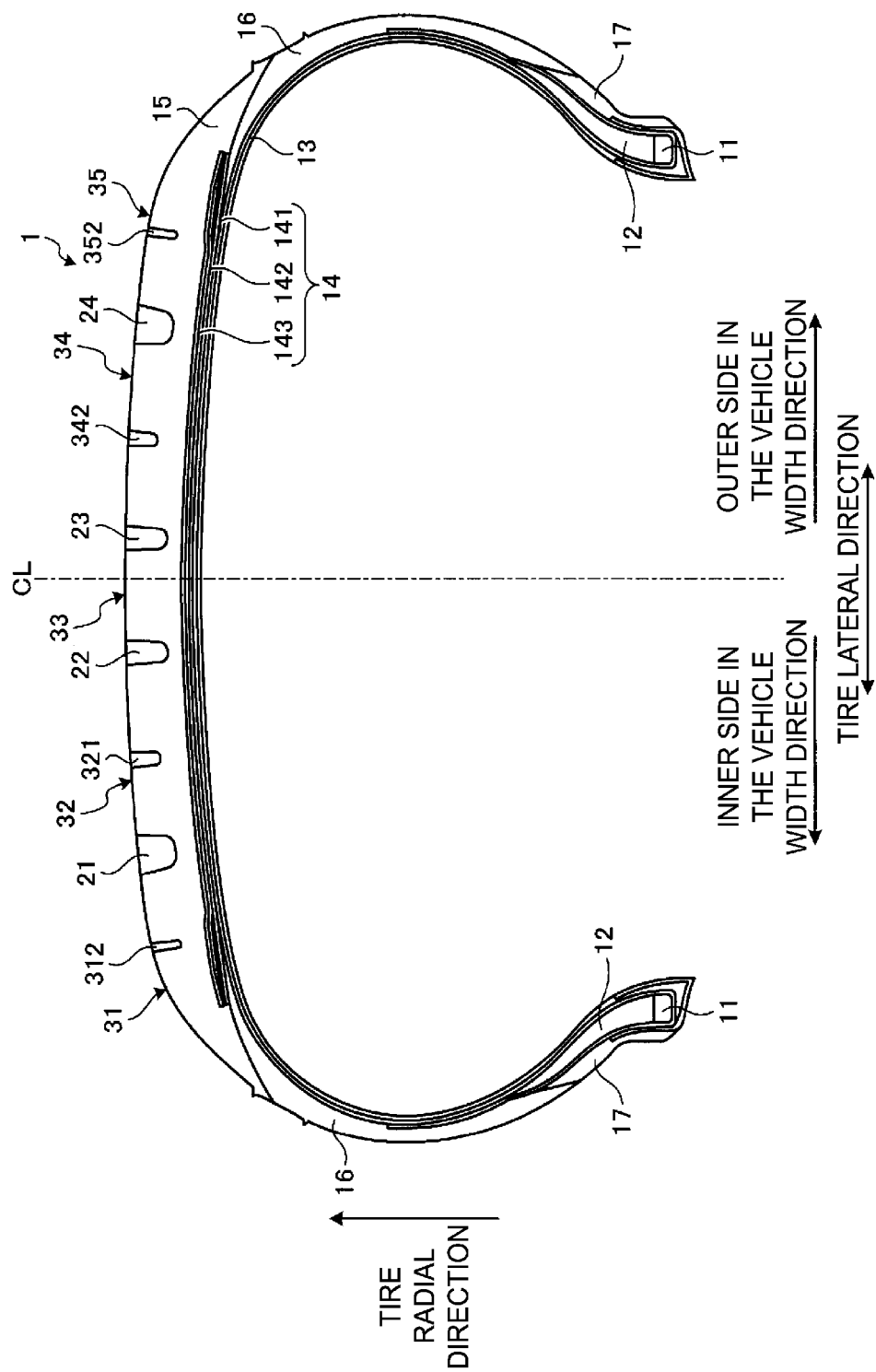
FIG. 1 is a cross-sectional view in a tire meridian direction illustrating a pneumatic tire according to an embodiment of the technology.

FIG. 1 is a cross-sectional view in a tire meridian direction illustrating a pneumatic tire according to an embodiment of the technology. The same drawing illustrates a cross-sectional view of a half region in the tire radial direction. Also, the same drawing illustrates a radial tire for a passenger vehicle as an example of a pneumatic tire.

In reference to the same drawing, "cross section in a tire meridian direction" refers to a cross section of the tire taken along a plane that includes the tire rotation axis (not illustrated). Reference sign CL denotes the tire equatorial plane and refers to a plane normal to the tire rotation axis that passes through the center point of the tire in the tire rotation axis direction. "Tire lateral direction" refers to the direction parallel with the tire rotation axis. "Tire radial direction" refers to the direction perpendicular to the tire rotation axis. Further, the inner side in the vehicle width direction and the outer side in the vehicle width direction are defined with respect to the vehicle width direction when the tire is mounted on the vehicle. Of the left and right regions demarcated by the tire equatorial plane, the region on the outer side in the vehicle width direction when the tire is mounted on the vehicle is referred to as the outer region, and the region on the inner side in the vehicle width direction is referred to as the inner region.

The pneumatic tire 1 has an annular structure with the tire rotation axis as its center and includes a pair of bead cores 11, 11, a pair of bead fillers 12, 12, a carcass layer 13, a belt layer 14, a tread rubber 15, a pair of sidewall rubbers 16, 16, and a pair of rim cushion rubbers 17, 17 (see FIG. 1).

The pair of bead cores 11, 11 are annular members constituted by a plurality of bead wires bundled together. The pair of bead cores 11, 11 constitute the cores of the left and right bead portions. The pair of bead fillers 12, 12 are disposed outward of the pair of bead cores 11, 11 in the tire radial direction and constitute the bead portions.

The carcass layer 13 has a single layer structure made of one carcass ply or a multilayer structure made of a plurality of carcass plies, and extends between the left and right bead cores 11, 11 in a toroidal shape, forming the framework of the tire. Additionally, both end portions of the carcass layer 13 are turned back outwardly in the tire lateral direction so as to wrap around the bead cores 11 and the bead fillers 12 and fixed. The carcass ply (plies) of the carcass layer 13 is made by performing a rolling process on coating rubber-covered carcass cords made of steel or an organic fiber material (e.g. aramid, nylon, polyester, rayon, or the like). The carcass ply (plies) has a carcass angle (defined as the inclination angle of the longitudinal direction of the carcass cords with respect to the tire circumferential direction), as an absolute value, ranging from 80 degrees to 95 degrees.

The belt layer 14 is a multilayer structure including a pair of cross belts 141, 142 and a belt cover 143, and is disposed around the outer circumference of the carcass layer 13. The pair of cross belts 141, 142 are made by performing a rolling process on coating rubber-covered belt cords made of steel or an organic fiber material. The cross belts 141, 142 have a belt angle, as an absolute value, ranging from 20 degrees to 55 degrees. Furthermore, the pair of cross belts 141, 142 have belt angles (defined as the inclination angle of the longitudinal direction of the belt cords with respect to the tire circumferential direction) of opposite signs, and the belts are layered so that the longitudinal directions of the belt cords intersect each other (i.e., crossply structure). Additionally, the belt cover 143 is made by coating belt cords made of steel or an organic fiber material with a coating rubber. The belt cover 143 has a belt angle, as an absolute value, ranging from 0 degrees to 10 degrees. Further, the belt cover 143 is, for example, a strip material formed by coating one or more belt cords with a coating rubber and winding the strip material spirally around the outer circumferential surface of the cross belts 141, 142 multiple times in the tire circumferential direction.

The tread rubber 15 is disposed outward of the carcass layer 13 and the belt layer 14 in the tire radial direction and constitutes a tread portion. The pair of sidewall rubbers 16, 16 are disposed outward of the carcass layer 13 in the tire lateral direction and constitute left and right sidewall portions. The pair of rim cushion rubbers 17, 17 are disposed inward of the left and right bead cores 11, 11 and the turned back portions of the carcass layer 13 in the tire radial direction. The pair of rim cushion rubbers 17, 17 constitute the contact surfaces of the left and right bead portions with the rim flanges.

Tread Pattern

Figure 2:
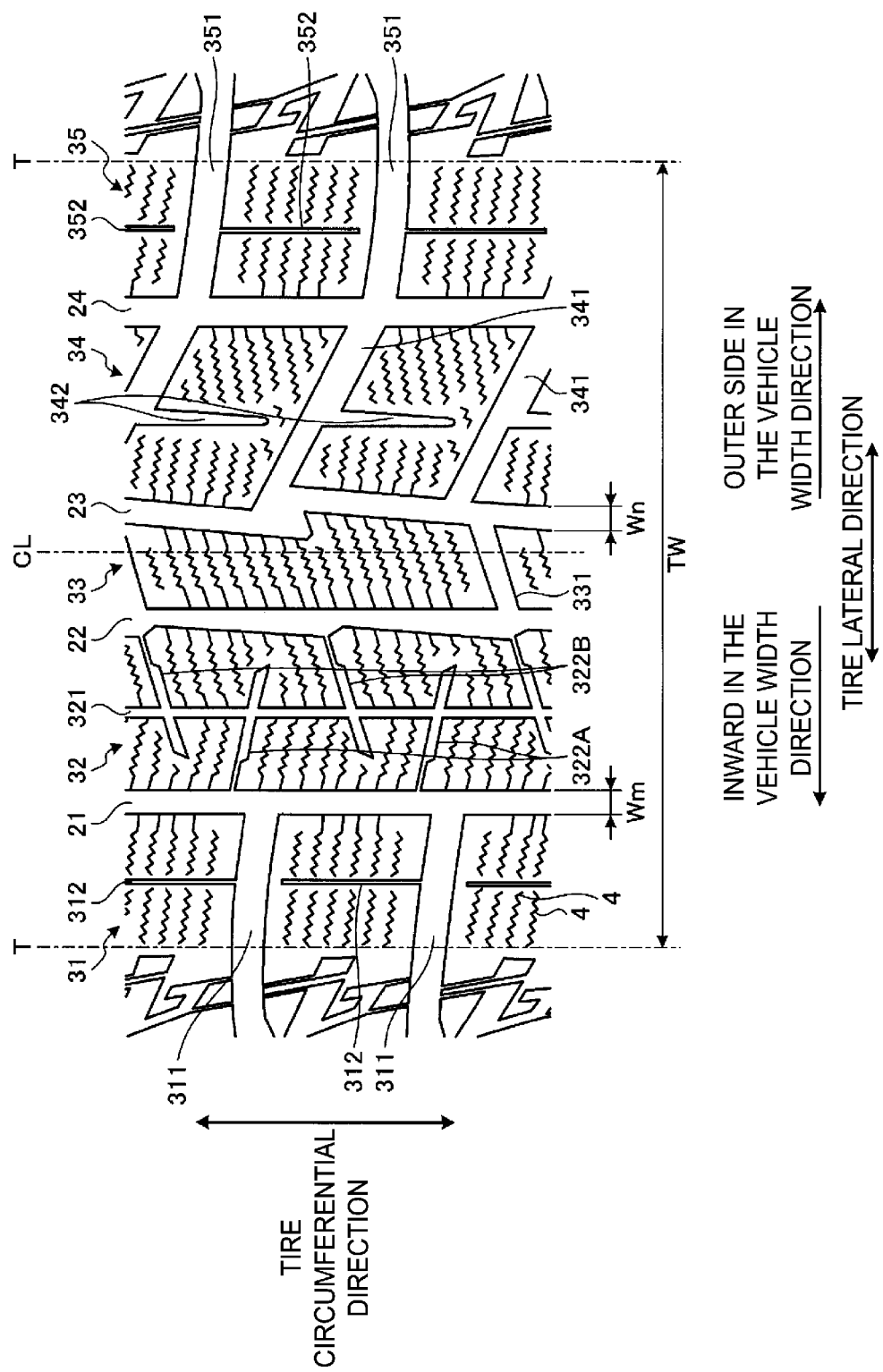
FIG. 2 is a plan view illustrating a tread surface of the pneumatic tire illustrated in FIG. 1.

FIG. 2 is a plan view illustrating a tread surface of the pneumatic tire illustrated in FIG. 1. The same drawing illustrates a tread pattern of a studless tire. In reference to the same drawing, "tire circumferential direction" refers to the direction revolving about the tire rotation axis. Reference sign T denotes a tire ground contact edge.

As illustrated in FIG. 2, the pneumatic tire 1 is provided with, in the tread portion, a plurality of circumferential main grooves 21 to 24 extending in the tire circumferential direction, a plurality of land portions 31 to 35 defined by the circumferential main grooves 21 to 24, and a plurality of lug grooves 311, 322A, 322B, 331, 341, and 351 disposed in the land portions 31 to 35.

"Main groove" refers to a groove on which a wear indicator must be provided as specified by JATMA (Japan Automobile Tyre Manufacturers Association, Inc.) and typically has a groove width of 5.0 mm or greater and a groove depth of 6.5 mm or greater. "Lug groove" refers to a lateral groove extending in a tire lateral direction and typically having a groove width of 1.0 mm or greater and a groove depth of 3.0 mm or greater. "Sipe" (described below) refers to a cut formed in a tread contact surface and typically has a sipe width of less than 1.0 mm and a sipe depth of 2.0 mm or greater, so that the sipe closes when the tire comes into contact with the ground.

The groove width is the maximum distance between the left and right groove walls at the groove opening portion and is measured when the tire is mounted on a specified rim, inflated to the specified internal pressure, and in an unloaded state. In configurations in which the land portions include notch portions or chamfered portions on the edge portions thereof, the groove width is measured with reference to the intersection points where the tread contact surface and extension lines of the groove walls meet, when viewed in a cross-section normal to the groove length direction. Additionally, in configuration in which the grooves extend in a zigzag-like or wave-like manner in the tire circumferential direction, the groove width is measured with reference to the center line of the amplitude of the groove walls.

The groove depth is the maximum distance from the tread contact surface to the groove bottom and is measured when the tire is mounted on a specified rim, inflated to the specified internal pressure, and in an unloaded state. Additionally, in configurations in which the grooves include an uneven portion or sipes on the groove bottom, the groove depth is measured excluding these portions.

The sipe width is measured as the maximum distance of the opening width of the sipe at the ground contact surface of the land portion, when the tire is mounted on a specified rim, inflated to the specified internal pressure, and in an unloaded state.

The sipe depth is measured as the maximum distance from the tread contact surface to the sipe bottom, when the tire is mounted on a specified rim, inflated to the specified internal pressure, and in an unloaded state. Additionally, in a configuration in which a sipe includes a ridged/grooved portion on the groove bottom, the sipe depth is measured excluding this portion.

"Specified rim" refers to an "applicable rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). Additionally, "specified internal pressure" refers to a "maximum air pressure" defined by JATMA, to the maximum value in "TIRE LOAD LIMITS AT VARIOUS COLD INFLATION PRESSURES" defined by TRA, and to "INFLATION PRESSURES" defined by ETRTO. Additionally, "specified load" refers to a "maximum load capacity" defined by JATMA, the maximum value in "TIRE LOAD LIMITS AT VARIOUS COLD INFLATION PRESSURES" defined by TRA, or "LOAD CAPACITY" defined by ETRTO. However, in the case of JATMA, for a passenger vehicle tire, the specified internal pressure is an air pressure of 180 kPa, and the specified load is 88% of the maximum load capacity.

For example, in the configuration of FIG. 2, the pneumatic tire 1 has a left-right asymmetric tread pattern with respect to the tire equatorial plane CL, and the inner region and the outer region in the vehicle width direction have different grounding characteristics.

Furthermore, in the configuration of FIG. 2, the left and right regions demarcated by the tire equatorial plane CL each have two circumferential main grooves 21, 22; 23, 24. For example, these circumferential main grooves 21, 22; 23, 24 are disposed being substantially left-right symmetric with respect to the tire equatorial plane CL. Five land portions 31 to 35 are defined by these circumferential main grooves 21, 22; 23, 24. In addition, one land portion 33 is disposed on the tire equatorial plane CL.

However, no such limitation is intended, and three, or five or more circumferential main grooves may be disposed, or the circumferential main grooves may be arranged asymmetrically with respect to the tire equatorial plane CL (not illustrated). In addition, the land portion may be arranged at a position off from the tire equatorial plane CL, with one circumferential main groove being arranged on the tire equatorial plane CL (not illustrated).

In one region demarcated by the tire equatorial plane CL, the left and right circumferential main grooves 21, 24 located on the outermost side in the tire lateral direction are defined as an outermost circumferential direction main grooves. The outermost circumferential main grooves are respectively defined in left and right regions demarcated by the tire equatorial plane CL. Also, the outermost circumferential main groove 21 in the vehicle width direction inner region is referred to as an inner outermost circumferential main groove, and the outermost circumferential main groove 24 in the vehicle width direction outer region is referred to as an outer outermost circumferential main groove. Also, the circumferential main grooves 22, 23 disposed closer to the tire equatorial plane CL than the outermost circumferential main grooves are defined as the center circumferential main grooves. Generally, the distance from the tire equatorial plane CL to the outermost circumferential main grooves 21, 24 (dimension symbol omitted in the drawing) ranges from 20% to 35% of a tire ground contact width TW.

The tire ground contact width TW is measured as the maximum linear distance in the tire axial direction of a contact surface between the tire and a flat plate when the tire is mounted on a specified rim, inflated to the specified internal pressure, placed perpendicular to the flat plate in a static state, and loaded with a load corresponding to the specified load.

The tire ground contact edge T is defined as the maximum width position in the tire axial direction of the contact surface between the tire and a flat plate when the tire is mounted on a specified rim, inflated to the specified internal pressure, placed perpendicular to the flat plate in a static state, and loaded with a load corresponding to the specified load.

Moreover, the land portions 31, 35 located outward in the tire lateral direction that are defined by the outermost circumferential main grooves 21, 24 are defined as shoulder land portions. The shoulder land portions 31, 35 are located on the tire ground contact edges T. In addition, the shoulder land portion 31 disposed in the vehicle width direction inner region is referred to as an inner shoulder land portion, and the shoulder land portion 35 disposed in the vehicle width direction outer region is referred to as an outer shoulder land portion. Furthermore, the land portions 32, 34 located inward in the tire lateral direction defined by the outermost circumferential main grooves 21, 24 are defined as second land portions. Accordingly, the second land portions 32, 34 are adjacent to the shoulder land portions 31, 35 with the outermost circumferential main grooves 21, 24 disposed therebetween. Also, the second land portion 32 disposed in the vehicle width direction inner region is referred to as the inner second land portion, and the second land portion 34 disposed in the vehicle width direction outer region is referred to as the outer second land portion. Furthermore, the land portion 33 located closer to the tire equatorial plane CL than the second land portions 32, 34 is defined as a center land portion. The center land portion 33 may be disposed on the tire equatorial plane CL (see FIG. 2) or may be arranged at a position off from the tire equatorial plane CL (not illustrated).

Note that in the configuration of FIG. 2, only a single center land portion 33 exists, but in a configuration having five or more circumferential main grooves, a plurality of center land portions are defined (not illustrated). Further, in the configuration having three circumferential main grooves, the center land portion also serves as the second land portion (not illustrated).

Further, in the configuration of FIG. 2, one circumferential main groove 23 in the outer region has a zigzag shape (described below), and the other three circumferential main grooves 21, 22, 24 have a straight shape. However, no such limitation is intended, and a part or the whole of the other three circumferential main grooves 21, 22, 24 may have a zigzag shape, a wavy shape or a step shape having amplitude in the tire lateral direction (not illustrated).

In addition, the pneumatic tire 1 includes a mounting direction indicator portion (not illustrated) that indicates the mounting direction with respect to the vehicle. The mounting direction indicator portion, for example, is constituted by a mark or ridges/grooves on the sidewall portion of the tire. For example, Economic Commission for Europe Regulation 30 (ECER30) requires that a mounting direction indicator portion is provided on the sidewall portion on the outer side in the vehicle width direction when the tire is mounted on a vehicle.

Block Rows of Inner Second Land Portion

In recent years, achieving performance on snow and performance on ice in a compatible manner has become increasingly important in the development of studless tires. Especially, for performance on ice, there are many demands for improving braking ability, turnability, and the like. Generally, reducing the groove area of the tread pattern is effective for improving the performance on ice, while increasing the groove area of the tread pattern is effective for improving performance on snow. Accordingly, this presents an issue that achieving performance on snow and performance on ice in a compatible manner is difficult.

Thus, the pneumatic tire 1 adopts the following configuration in order to achieve performance on snow and performance on ice in a compatible manner.

Figure 3:
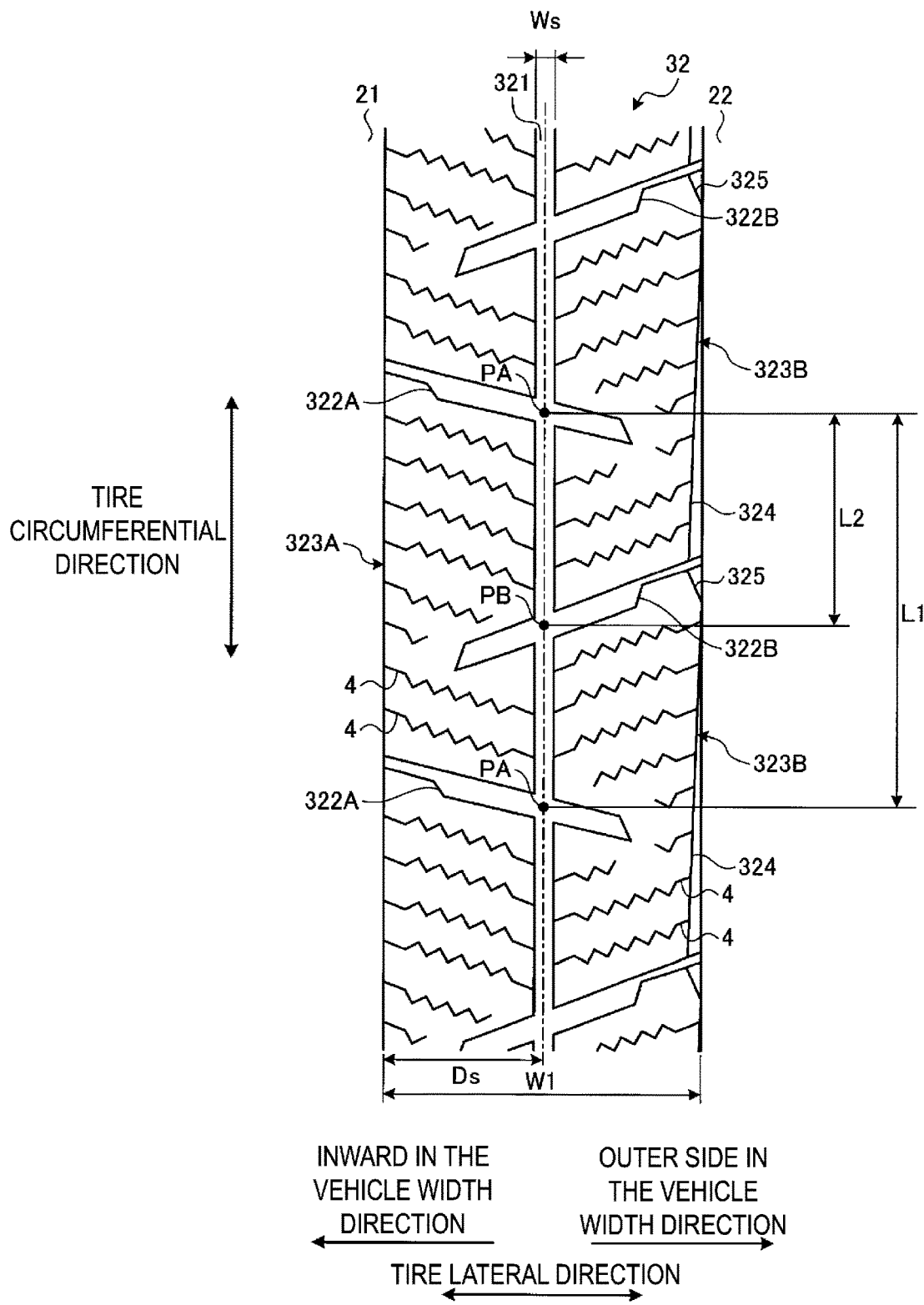
FIG. 3 is a plan view illustrating a land portion the tread pattern illustrated in FIG. 2.
Figure 4:
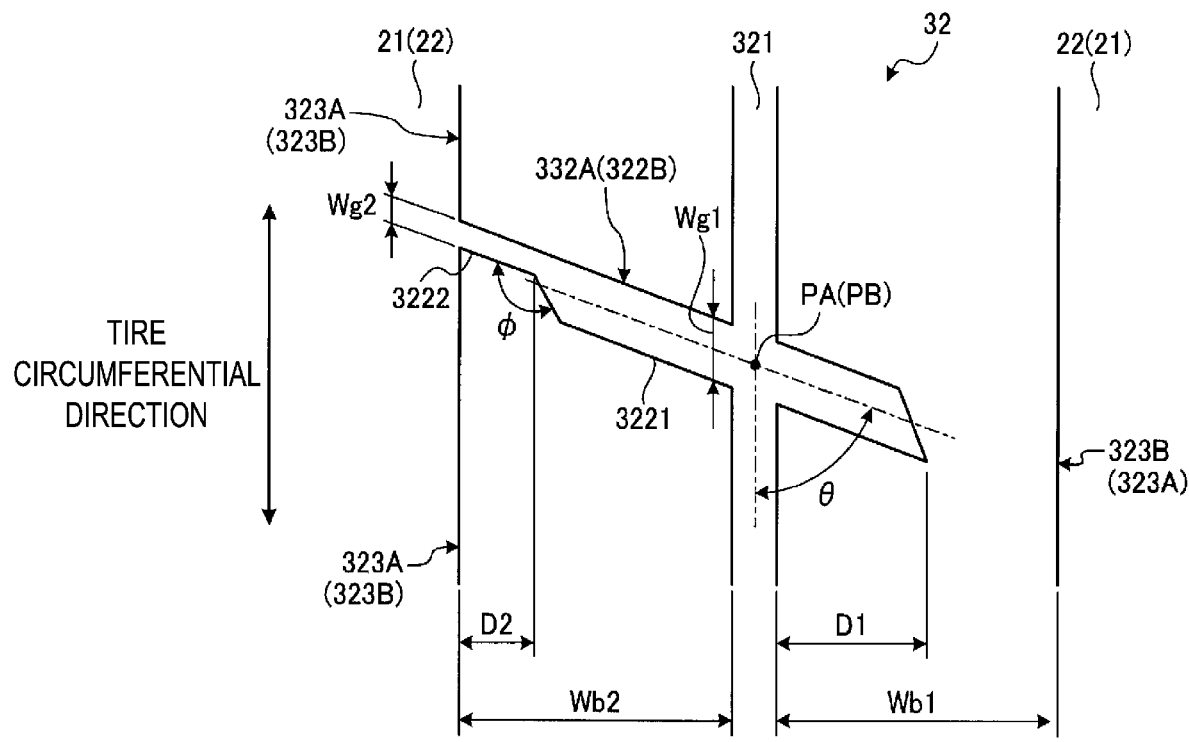
FIG. 4 is an explanatory diagram illustrating a lug groove in the land portion illustrated in FIG. 3.

FIG. 3 is a plan view illustrating a land portion of the tread pattern illustrated in FIG. 2. FIG. 4 is an explanatory diagram illustrating a lug groove in the land portion illustrated in FIG. 3. In these drawings, FIG. 3 is an enlarged plan view of the inner second land portion 32, and FIG. 4 schematically illustrates the extracted shape of the lug grooves 322 (322A, 322B) arranged in the inner second land portion 32.

As illustrated in FIG. 3, the inner second land portion 32 includes one circumferential narrow groove 321 and two kinds of plurality of lug grooves 322A and 322B.

The circumferential narrow groove 321 is a narrow groove extending in the tire circumferential direction, and is disposed at the center in the lateral direction of the land portion 32. Specifically, a groove width Ws of the circumferential narrow groove 321 and a groove width Wm (see FIG. 2) of the outermost circumferential main groove 21 preferably have the relationship $0.20 \le Ws/Wm \le 0.50$. In addition, a target for comparison is the outermost circumferential main grooves 21 arranged in the same region as the circumferential narrow grooves 321, out of the left and right regions bounded by the tire equatorial plane CL. In addition, a distance Ds from one edge portion of the land portion 32 to the groove center line of the circumferential narrow groove 321 and a width W1 of the land portion 32 preferably have the relationship $0.35 \le Ds/W1 \le 0.65$ and more preferably have the relationship $0.40 \le Ds/W1 \le 0.55$. The rigidity of the left and right regions of the land portion 32 divided by the circumferential narrow groove 321 are made uniform accordingly.

The distance Ds is measured as the distance in the tire axial direction from the groove width measurement point of the circumferential main grooves 21, 22 to the groove center line of the circumferential narrow groove 321, when the tire is mounted on a specified rim, inflated to the specified internal pressure, and in an unloaded state.

The width W1 of the land portion 32 is measured based on the groove width measurement points of the left and right circumferential main grooves 21, 22 that define the land portion 32.

In a typical passenger car tire, the width W1 of the inner second land portion 32 and the tire ground contact width TW (see FIG. 2) are in the range $0.10 \le W1/TW \le 0.30$.

For example, in the configuration of FIG. 3, the circumferential narrow groove 321 has a straight shape. However, no such limitation is intended, and the circumferential narrow groove 321 may have a zigzag shape, a wavy shape, or a step shape having amplitude in the tire lateral direction. This increases the edge components of the land portion 32, which improves performance on snow and performance on ice. Furthermore, the groove depth of the circumferential narrow groove 321 is less than the groove depth of the circumferential main grooves 21, 22 on the left and right sides of the land portion 32. Thus, the rigidity of the shoulder land portion 32 is ensured.

The two kinds of lug grooves 322A, 322B are lateral grooves extending in the tire lateral direction and extending through the circumferential narrow groove 321, and are classified into a first lug groove 322A and a second lug groove 322B. Specifically, one end portion of the first lug groove 322A opens to one edge portion (the left side in FIG. 3) of the land portion 32, while the other end portion terminates within the land portion 32. One end portion of the second lug grooves 322B opens to the other edge portion (the right side in FIG. 3) of the land portion 32, while the other end portion terminates within the land portion 32. Accordingly, the first lug groove 322A and the second lug groove 322B have a semi-closed structure not traversing the land portion 32, and opens to mutually different circumferential main grooves 21, 22.

In such a configuration, due to the first lug grooves 322A and the second lug grooves 322B extending in the tire lateral direction and extending through the circumferential narrow grooves 321, opening to the circumferential main grooves 21, 22, a large number of groove intersection portions are provided increasing the groove volume. This enhances the snow column shearing force and snow discharge properties of the land portion 32 on snow-covered road surfaces. In addition, since the other end portions of the first lug groove 322A and the second lug groove 322B terminate within the land portion 32, the ground contact area of the land portion 32 is ensured and the adhesion frictional force on the icy road surface is ensured. Accordingly, performance on snow and performance on ice are achieved in a compatible manner.

In addition, the first lug grooves 322A and the second lug grooves 322B are alternately arranged with a predetermined interval in the tire circumferential direction. Accordingly, the first lug grooves 322A and the second lug grooves 322B left/right alternately open to the left and right circumferential main grooves 21 22, and left/right alternately intersect with circumferential narrow groove 321. In this way, since a large number of intersection portions where the first lug grooves 322A and the second lug grooves 322B intersect with the circumferential main grooves 21, 22 and the circumferential narrow groove 321 are ensured, the snow column shearing force and snow discharge properties of the land portion 32 on snow-covered road surfaces are improved. Further, since the opening portions of the first lug grooves 322A and the second lug grooves 322B are left/right alternately provided on the left and right edge portions of the land portion 32, the snow column shearing force and the edge effect of the lug grooves 322A, 322B are improved compared to the configuration (not illustrated) in which a plurality of lug grooves only open to one edge portion of the land portion. Accordingly, the turning performance of the tire on icy road surfaces is particularly improved.

Also, intersection points PA and PB of the groove center lines of the first lug groove 322A and the second lug groove 322B with the groove center line of the circumferential narrow groove 321 are defined. The distance L1 in the tire circumferential direction between the intersection points PA, PA for a pair of adjacent first lug grooves 322A, 322A, and the distance L2 from the intersection point PA for the first lug groove 322A to the intersection point PB for the second lug groove 322B preferably have the relationship $0.35 \le L2/L1 \le 0.65$, and more preferably $0.40 \le L2/L1 \le 0.60$. Accordingly, the arrangement interval for the lug grooves 322A, 322B in the land portion 32 is made uniform, which makes uniform the rigidity of the regions defined by the lug grooves 322A, 322B adjacent in the tire circumferential direction.

For example, in the configuration of FIG. 3, the inner second land portion 32 is defined by the right and left circumferential main grooves 21, 22, the circumferential narrow groove 321, and the two types of lug grooves 322A, 322B, forming a plurality of blocks 323A, 323B. Furthermore, due to the first lug grooves 322A and the second lug grooves 322B alternately opening to the left and right circumferential main grooves 21, 22, and the circumferential narrow groove 321, the blocks 323A, 323B are arranged in a staggered manner over the entire circumference of the tire. Accordingly, since the groove edge amount can be maximized while making the block rigidity uniform, performance on ice of the tire is greatly improved.

In addition, the first lug grooves 322A and the second lug grooves 322B have a structure that is linearly symmetric to each other, and are inclined at the same inclination angle in opposite directions with respect to the tire circumferential direction. Accordingly, the blocks 323A, 323B on the right and left of the circumferential narrow groove 321 have a congruent parallelogram shape. With such a configuration, as compared with a configuration (not illustrated) in which all the lug grooves of the land portion are inclined in the same direction, the edge effect of the lug grooves 322A, 322B at the time of vehicle turning is improved. Accordingly, the turning performance of the tire on icy road surfaces is particularly improved. In addition, the groove depth of the first lug groove 322A and the second lug groove 322B is less than the groove depth of the circumferential main grooves 21, 22. Accordingly, the rigidity of the land portion 32 is ensured, and the performance on ice and the dry performance of the tire are ensured.

Further, the ground contact area ratio of the adjacent blocks 323A, 323A; 323A, 323B; 323B, 323B is preferably in the range from 0.80 to 1.20, and more preferably in the range from 0.90 to 1.10. Accordingly, the ground contact areas of adjacent blocks are made uniform, and uneven wear of the block is suppressed.

The ground contact area of the block is measured at a contact surface between a tire and a flat plate when the tire is mounted on a specified rim, inflated to the specified internal pressure, placed perpendicular to the flat plate in a static state, and loaded with a load corresponding to the specified load.

In the configuration of FIG. 3, the left and right circumferential main grooves 21, 22 defining the inner second land portion 32 have a straight shape. The edge portion of the inner second land portion 32 on the vehicle width direction inner side (the tire ground contact edge T side) does not include a notch portion or a chamfered portion, and has a straight shape over the entire circumference of the tire. Furthermore, the edge portion of the inner second land portion 32 on the vehicle width direction outer side (the tire equatorial plane CL side) has a zigzag shape having amplitude in the tire lateral direction. Specifically, one block 323B defined by the circumferential main groove 22, the circumferential narrow groove 321, and the pair of second lug grooves 322B, 322B, includes a pair of chamfered portions 324, 325 at the edge portion on the tire equatorial plane CL side. In addition, the first chamfered portion 324 has an elongated structure and extends from the opening portion of one of the lug grooves 322B adjacent in the tire circumferential direction to the vicinity of the opening portion of the other lug groove 322B. The width of the first chamfered portion 324 is the largest at the opening portion of the former lug groove 322B and gradually decreases toward the opening portion of the other lug groove 322B. The second chamfered portion 325 has a short structure and is formed at the opening portion of the other lug groove 322B. Due to each block 323B of the inner second land portion 32 including the pair of chamfered portions 324, 325 described above at the edge portion on the tire equatorial plane CL side, the edge portion of the tread surface of the inner second land portion 32 on the tire equatorial plane CL side has a zigzag shape over the entire circumference of the tire.

Further, in FIG. 4, the inclination angle $\theta$ of the lug groove 322A (322B) with respect to the tire circumferential direction is preferably within the range 40 degrees$\leq\theta\leq$85 degrees, and more preferably within the range 60 degrees$\leq\theta\leq$75 degrees. Accordingly, the inclination angle $\theta$ of the inclined grooves 322A (322B) is made appropriate. Namely, with 40 degrees$\leq\theta$ being satisfied, the inclination angle $\theta$ is properly ensured, and traction characteristics provided by the lug grooves 322A and 322B are ensured. With $\theta\leq$85 degrees being satisfied, the effect of improving turning performance on ice due to the inclination of the lug grooves 322A and 322B can be properly obtained.

The inclination angle $\theta$ of the lug grooves is measured as an angle between the groove center line of the lug grooves and the tire circumferential direction.

Further, the groove width Wg1 of the lug groove 322A (322B) at the crossing position with the circumferential narrow groove 321 and the groove width Wg2 of the lug groove 322A (322B) at the edge portion of the land portion 32 have the relationship Wg2<Wg1. Moreover, the ratio Wg2/Wg1 is preferably in the range 0.20$\leq$Wg2/Wg1$\leq$0.70. In such a configuration, the rigidity of the edge portion of the inner second land portion 32 is properly ensured by the groove width of the rug groove 322A (322B) being narrowed at the edge portion of the land portion 32. Thus, the performance on ice of the tire is ensured.

The maximum groove width (groove width Wg1 in FIG. 4) of the lug grooves 322A, 322B of the inner second land portion 32 is preferably in the range from 25% to 60%, and more preferably in the range from 30% to 50% of the groove width Wm (see FIG. 2) of the outermost circumferential main groove 21. Accordingly, the groove width Wg1 of the lug grooves 322A, 322B of the inner second land portion 32 is less than the groove width of a typical lug groove, in particular, the groove width of the lug groove 311 disposed in the shoulder land portion 31 (see FIG. 2). Thus, the groove width of the lug grooves 322A, 322B can be narrowed to ensure the ground contact area of the land portion 32. Also, the number of the lug grooves 322A, 322B in the land portion 32 can be increased to increase the edge components of the land portion 32.

For example, in the configuration of FIG. 4, the lug groove 322A (322B) has a step shape in which the groove width is narrowed at the opening portion to the circumferential main grooves 21, 22. Specifically, the lug groove 322A (322B) includes a wide portion 3221 extending through the circumferential narrow groove 321 and terminating within the land portion 32 and a narrow portion 3222 opening to the circumferential main groove 21, 22. The wide portion 3221 and the narrow portion 3222 are connected in a straight line. One edge portion (the upper side in FIG. 4) of the lug groove 322A (322B) has a linear shape, and the other edge portion (the lower side in FIG. 4) has a step shape. In addition, the inclination angle $\varphi$ of the rising portion of the step shape is an obtuse angle. The wide portion 3221 and the narrow portion 3222 have a constant groove width. Furthermore, the wide portion 3221 has a parallelogram shape as a whole. This effectively ensures the rigidity of the edge portion of the inner second land portion 32.

In addition, in the configuration of FIG. 4, the groove width Wg2 of the narrow portion 3222 is within the range 1 mm$\leq$Wg2, such that the narrow portion 3222 does not close when the tire comes into contact with the ground. Accordingly, the edge components of the lug groove 322A (322B) are adequately ensured when the tire comes into contact with the ground. However, no such limitation is intended, and the narrow portion 3222 may be close when the tire comes into contact with the ground by having a groove width similar to that of the sipe. This improves the rigidity of the edge portion of the inner second land portion 32 when the tire comes into contact with the ground.

Furthermore, in the land portion 32, the extending distance D2 in the tire lateral direction of the narrow portion 3222 of the lug groove 322A (322B) and the width Wb2 of the block 323A (323B) including the narrow portion 3222 preferably have the relationship $0.20 \leq D2/Wb2 \leq 0.50$, and more preferably have the relationship $0.30 \leq D2/Wb2 \leq 0.40$. Accordingly, the extending distance D2 of the narrow portion 3222 is appropriately set. Namely, satisfying $0.20 \leq D2/Wb2$ ensures the groove volume of the lug grooves 322A, 322B and ensures the snow-column shearing effect provided by the lug grooves 322A, 322B. Furthermore, satisfying $D2/Wb2 \leq 0.50$ appropriately ensures the reinforcing effect of the narrow portion 3222 on the rigidity of the edge portion of the land portion 32.

The distance D1 from the edge portion of the block 323B (323A) defined by the circumferential narrow groove 321 to the terminating end portion of the lug groove 322A (322B) and the width Wb1 of the block 323B (323A) preferably have the relationship $0.30 \leq D1/Wb1 \leq 0.70$, and more preferably have the relationship $0.40 \leq D1/Wb1 \leq 0.60$. Accordingly, the terminating end portion of the lug groove 322A (322B) is made appropriate. Namely, by satisfying $0.30 \leq D1/Wb1$, the edge effect provided by the lug grooves 322A, 322B and the snow column shearing effect are ensured. Further, by satisfying $D1/Wb1 \leq 0.70$, the rigidity of the blocks 323A, 323B is ensured.

Note that in the configuration of FIG. 3, the lug grooves 322A, 322B have a straight shape as a whole. However, the present technology is not limited to this, and the lug grooves 322A and 322B may have an arc shape, an S shape, a bent shape, or the like (not illustrated).

In relation to the inner shoulder land portion 31, as illustrated in FIG. 2, the total number N1 of the lug grooves 322A, 322B arranged in the inner second land portion 32 and the total number Nsh of lug grooves 311 arranged in the inner shoulder land portion 31 preferably have the relationship $1.2 \leq N1/Nsh \leq 3.5$, and more preferably have the relationship $1.5 \leq N1/Nsh \leq 2.5$. The edge components formed in the inner second land portion 32 contribute greatly to the performance on ice. Accordingly, by arranging the lug grooves 322A, 322B densely at the inner second land portion 32 as described above, the edge components of the inner second land portion 32 increases, and the effect of improving performance on ice can be efficiently obtained. On the other hand, due to the rug grooves 311 being arranged sparsely at the inner shoulder land portion 31, the rigidity of the inner shoulder land portion 31 is ensured.

For example, in the configuration of FIG. 2, the number of pitches of the inner shoulder land portion 31 is equal to the number of pitches of the inner second land portion 32, and in the inner shoulder land portion 31, one lug groove 311 is arranged at one pitch, and a pair of lug grooves 322A and 322B are arranged at one pitch in the inner second land portion 32. In addition, the groove width of the lug grooves 322A and 322B (the maximum groove width Wg1 in FIG. 4) disposed in the inner second land portion 32 is narrower than the groove width of the lug grooves 311 disposed in the inner shoulder land portion (the dimension symbols are omitted in the figure). Specifically, the groove width of the lug grooves 322A, 322B of the inner second land portion 32 is preferably in the range from 15% to 60%, and more preferably in the range from 20% to 50% of the groove width of the lug groove 311 of the inner shoulder land portion 31. In this manner, while providing a large total number N1 of the lug grooves 322A, 322B to increase the edge component of the inner second land portion 32, the groove width of the lug grooves 322A, 322B is narrowed to ensure the ground contact area of the inner second land portion 32. At the same time, the groove area ratio of the inner shoulder land portion 31 and the groove area ratio of the inner second land portion 32 are made uniform.

In the configuration of FIG. 2, the pitch number of the inner shoulder land portion 31 and the pitch number of the inner second land portion 32 are configured to be the same as described above, but no such limitation is intended, and the land portions 31, 32 may have different numbers of pitches. At this time, the pitch number of the inner second land portion 32 is preferably larger than the pitch number of the inner shoulder land portion 31. In this way, an effect of improving performance on ice can be efficiently obtained and the rigidity of the inner shoulder land portion 31 is ensured.

In addition, for example, in the configuration of FIG. 2, the land portions 31 to 35 each include the plurality of sipes. Further, as illustrated in FIG. 3, the inner second land portion 32 includes a plurality of sipes 4 on the tread surfaces of the left and right blocks 323A, 323B demarcated by the circumferential narrow groove 321. In addition, the inclination direction of the sipe 4 arranged in one block 323A and the inclination direction of the sipe 4 arranged in the other block 323B, demarcated by the circumferential narrow groove 321, are different from each other. Specifically, in the block 323A on the left side of FIG. 3, the sipe 4 is disposed parallel to the first lug groove 322A and is inclined downward to the right in the drawing together with the first lug groove 322A. Similarly, in the block 323B on the right side of FIG. 3, the sipe 4 is disposed parallel to the second lug groove 322B and is inclined upward to the right in the drawing together with the second lug groove 322B. Accordingly, the edge effect of the sipe 4 at the time of turning of the vehicle is improved, and the turning performance of the tire on icy road surfaces is particularly improved.

Modified Examples

Figure 5:
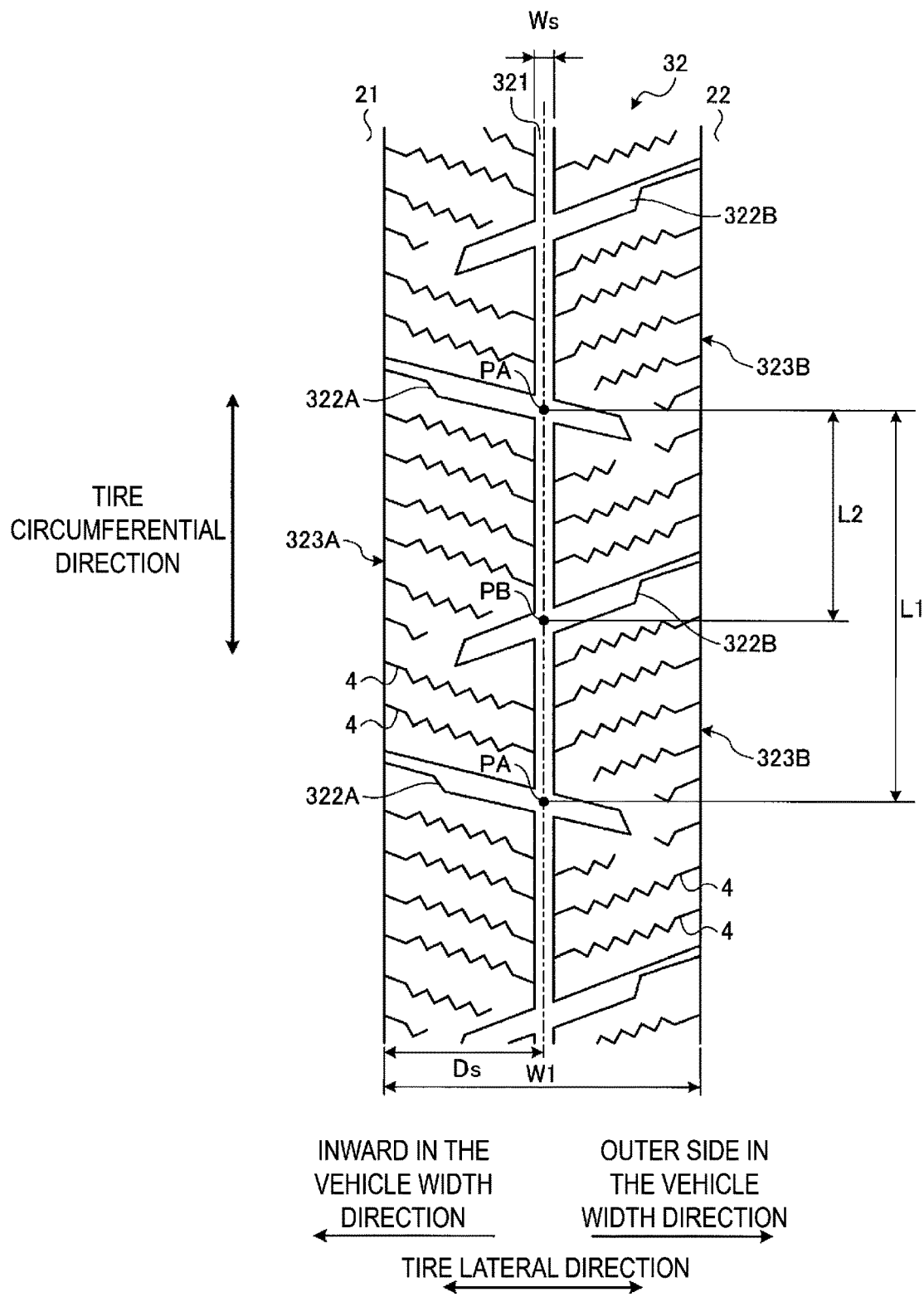
FIG. 5 is an explanatory diagram illustrating a modified example of the pneumatic tire illustrated in FIG. 1.

FIG. 5 is an explanatory diagram of a modified example of the pneumatic tire illustrated in FIG. 1. The same drawing is an enlarged plan view illustrating the inner second land portion 32.

In the configuration of FIG. 3, as described above, the circumferential main grooves 21, 22 defining the inner second land portion 32 both have a straight shape. Further, the edge portion of the inner second land portion 32 on the vehicle width direction inner side (the tire ground contact edge T side) does not include a notch portion or a chamfered portion, and has a straight shape over the entire circumference of the tire. On the other hand, the edge portion on the outer side in the vehicle width direction (the side of the tire equatorial plane CL) has a zigzag shape constituted by alternately arranging an elongated chamfered portion 324 and a short chamfered portion 325 in the tire circumferential direction. With such a configuration, since the edge portion of the inner second land portion 32 on the side of the tire ground contact edge T has a straight shape, the ground contact area of the inner second land portion 32 is ensured and the performance on ice of the tire is ensured. At the same time, since the edge portion on the tire equatorial plane CL side has a zigzag shape, the snow column shearing effect in the center region of the tread portion is enhanced, improving the performance on snow of the tire.

However, no such limitation is intended, and in the configuration of FIG. 3, both edge portions of the inner second land portion 32 may have a straight shape, or a zigzag shape, a wave shape, or a step shape having amplitude in the tire lateral direction (not illustrated). Further, in contrast with the configuration of FIG. 3, the edge portion on the inner side in the vehicle width direction of the inner second land portion 32 may have a zigzag shape, a wave-like shape, or a step shape, and the edge portion on the outer side in the vehicle width direction may have a straight shape (not illustrated). In addition, one or both of the left and right circumferential main grooves 21, 22 defining the inner second land portion 32 may have a zigzag shape, a wavy shape or a step shape (not illustrated).

In the configuration of FIG. 5, both of the left and right circumferential main grooves 21, 22 defining the inner second land portion 32 have a straight shape, and both edge portions of the inner second land portion 32 have a straight shape. The ground contact area of the inner second land portion 32 is ensured, and the performance on ice of the tire is enhanced accordingly.

Figure 6:
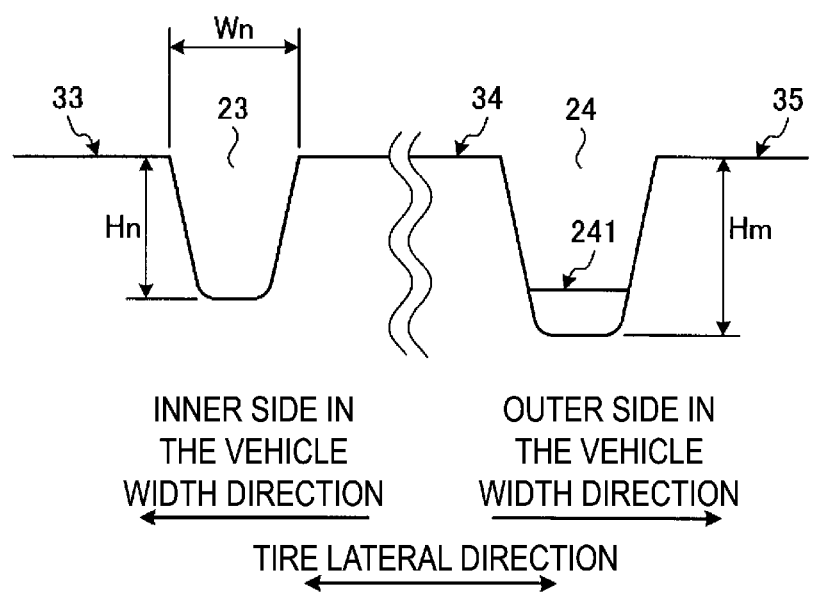
FIG. 6 is a cross-sectional view illustrating a pair of circumferential main grooves in an outer region in the vehicle width direction.

Circumferential Main Groove and Lug Groove in Outer Side Area in the Vehicle Width Direction FIG. 6 is a cross-sectional view illustrating a pair of circumferential main grooves in an outer region in the vehicle width direction. The same drawing illustrates cross-sectional views of the left and right circumferential main grooves 23, 34 defining the outer second land portion 34.

The circumferential main groove 23 is provided as an outer center circumferential direction main groove that defines the center land portion 33. The outermost circumferential main groove 24 is provided as a wear detection main groove including a tread wear indicator 241 that indicates terminal stages of wear. The tread wear indicator 241 is formed projecting from the groove bottom of the outermost circumferential main groove 24 having a length that is short in the tire lateral direction, and is provided at a plurality of positions on the circumference of the tire in the outermost circumferential main groove 24. The groove depth Hn of the circumferential main groove 23 and the groove depth Hm of the outermost circumferential main groove 24 with the tread wear indicator 241 have the relationship in the range $0.25\ Hm \leq Hn \leq 1.00\ Hm$. Note that, in this case, the groove depth Hm of the outermost circumferential main groove 24 is the depth at a position not having the tread wear indicator 241, and the relationship is preferably in the range $0.50\ Hm \leq Hn \leq 1.00\ Hm$.

In addition, the groove width Wn of the circumferential main groove 23 is in the range $3\ mm \leq Wn \leq 10\ mm$. Preferably, the groove width Wn of the circumferential main groove 23 is in the range $3.5\ mm \leq Wn \leq 7.0\ mm$.

The lug grooves 331 are provided as center lug grooves defining the center land portion 33 and are formed to extend in the tire lateral direction between the two circumferential main grooves 22, 23, and both ends are connected to the circumferential main grooves 22, 23. Further, the lug grooves 341 are formed to extend in the tire lateral direction between the adjacent circumferential main grooves 23 and the outermost circumferential main grooves 24, one end of which is connected to the circumferential main groove 23, the other end is connected to the outermost circumferential main groove 24. Namely, the lug grooves 341 are provided as outer second lug grooves extending from the circumferential main grooves 23 toward the outer second land portions 34 in the tire lateral direction and defining the outer second land portions 34. The outer shoulder lug grooves 351 are formed to extend in the tire lateral direction at positions outward in the tire lateral direction of the outermost circumferential main grooves 24. End portions on the inner side in the tire lateral direction are connected to the outermost circumferential main grooves 24. Further, these lug grooves 331, 341, and 351 extend in the tire lateral direction, respectively, and are inclined or curved in the tire circumferential direction. The form of the lug grooves such as inclination and curvature in the tire circumferential direction with respect to the tire lateral direction is appropriately configured according to the target tread pattern.

The land portions 33 to 35 in the outer region are defined by the circumferential main grooves 23 and 24 and the lug grooves 331, 341, and 351, and regarding the land portions 33 to 35, the land portion 33 is positioned between the two circumferential main grooves 23 and 24, the outer second land portion 34 is positioned between the circumferential main grooves 23 and the outermost circumferential main groove 24, and a shoulder land portion 35 is positioned outside the outermost circumferential main groove 24 in the tire lateral direction. Out of these, the center land portion 33 is located on the tire equatorial plane CL, and is defined by the circumferential main groove 23 and the lug groove 331. In addition, the outer second land portion 34 is formed adjacently to the center land portion 33 interposing the circumferential main groove 23, and is defined by the circumferential main groove 23, the outermost circumferential main groove 24, and the lug grooves 341. Further, the outer shoulder land portion 35 is formed adjacently to the outer second land portion 34 interposing the outermost circumferential main groove 24, and is defined by the outermost circumferential main groove 24 and the outer shoulder lug groove 351. In the outer shoulder land portion 35, a circumferential recessed portion 352 extending in the tire circumferential direction and including one end connected to the outer shoulder lug groove 351 and the other end terminating within the outer shoulder land portion 35 is formed. As described above, the center land portion 33, the outer second land portion 34, and the outer shoulder land portion 35 are formed in a block shape by being defined by circumferential main grooves and lug grooves, respectively.

A number of sipes 4 are formed on the tread surface. The sipes 4 are formed in the land portions 33 to 35, respectively of the center land portion 33, the outer second land portions 34, and the outer shoulder land portions 35, each having a zigzag shape with amplitude in the tire circumferential direction and extending in the tire lateral direction.

Outer Center Circumferential Main Groove and Outer Second Land Portion

Figure 7:
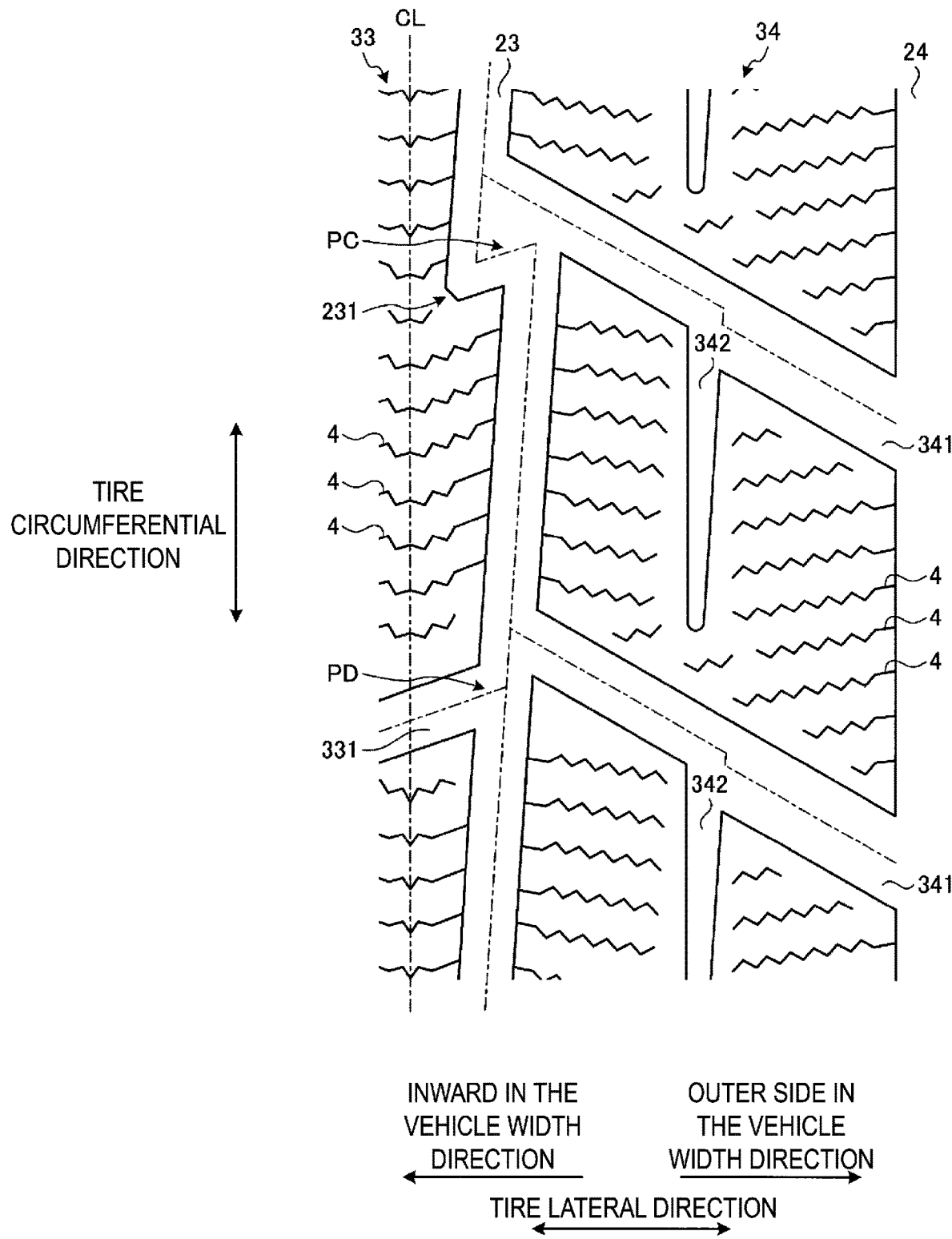
FIG. 7 is an enlarged plan view illustrating the outer center circumferential main groove and the outer second land portion described in FIG. 2.

FIG. 7 is an enlarged plan view illustrating an outer center circumferential main groove and outer second land portion illustrated in FIG. 2.

The circumferential main groove 23 has a bent portion 231 formed by the center side edge portion being bent at the center side edge portion which is the edge portion on the center land portion 33 side. Specifically, the circumferential main groove 23 is formed such that at a plurality of predetermined positions in the tire circumferential direction the position is shifted in the tire lateral direction by substantially the same length as the circumferential main groove 23 groove width. In other words, the circumferential main groove 23 is formed in a direction oriented to the tire lateral direction while extending in the tire circumferential direction, namely, the circumferential main groove 23 is inclined with respect to the tire circumferential direction. Thus, due to the circumferential main groove 23 being shifted at a plurality of predetermined positions in the tire circumferential direction to the direction opposite to the inclination direction of the circumferential main groove 23, the circumferential main groove 23 is formed such that its position as a whole in the tire lateral direction is within a predetermined range. In other words, the circumferential main groove 23 is formed in a zigzag shape extending in the tire circumferential direction with amplitude in the tire lateral direction.

Since the circumferential main groove 23 is formed to shift in the tire lateral direction at a plurality of positions in this manner, its center side edge portion and its second side edge portion which is the edge portion of the circumferential main groove 23 on the outer second land portion 34 side, are both shifted toward the same direction in the tire lateral direction, at the position in the tire circumferential direction where the circumferential main groove 23 is shifted to the tire lateral direction. In the bent portion 231 formed at the center side edge portion, the center side edge portion is bent in the tire lateral direction at a position in the tire circumferential direction where the center side edge portion is shifted in the tire lateral direction, such that the center side edge portions having different positions in the tire lateral direction are connected to each other.

Figure 8:
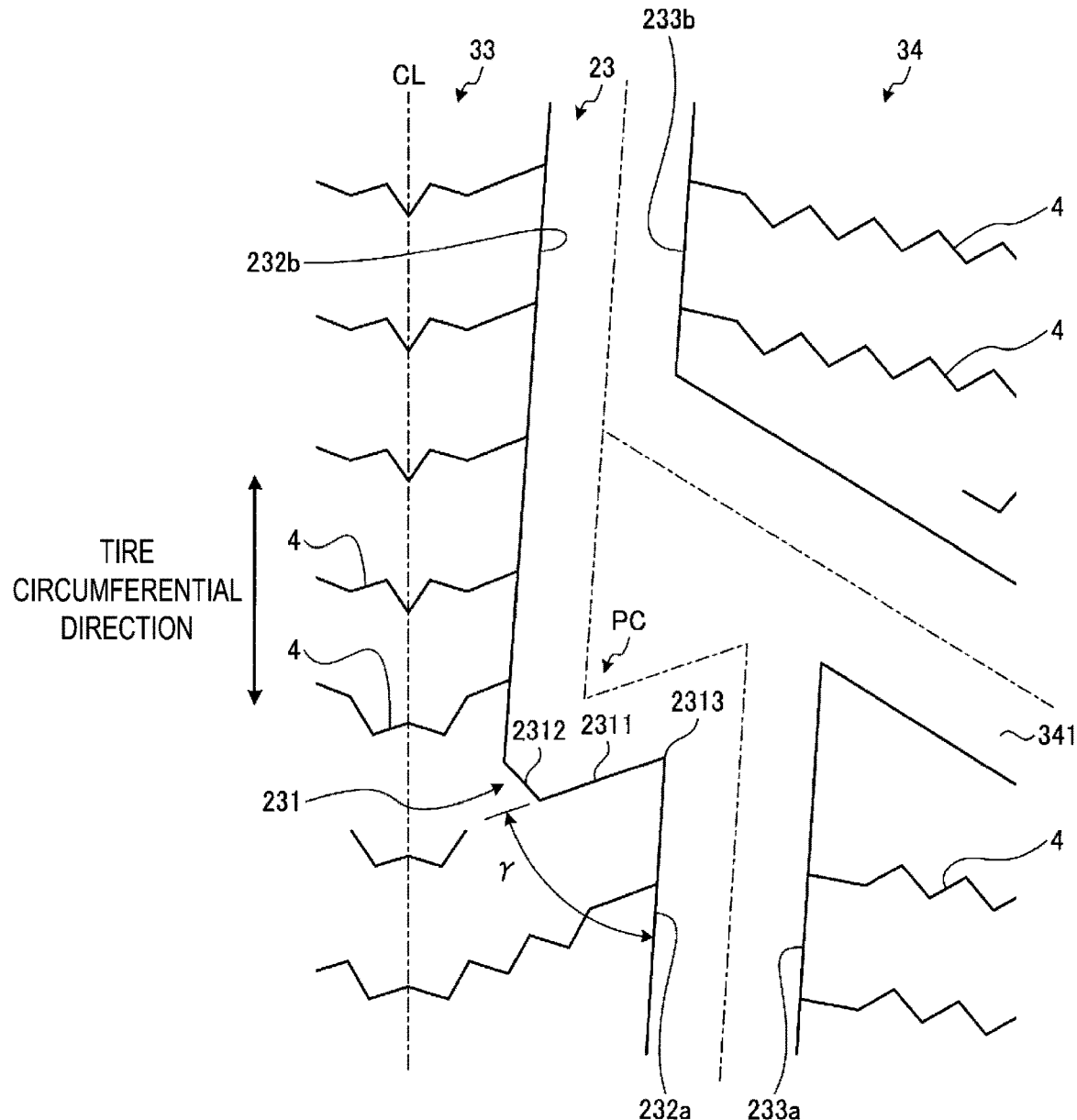
FIG. 8 is an enlarged view illustrating a bent portion of the outer center circumferential main groove described in FIG. 7.

FIG. 8 is an enlarged view illustrating a bent portion of the outer circumferential main groove illustrated in FIG. 7. The same drawing illustrates an enlarged view of the three-way intersection point PC of the outer center circumferential main groove 23 and the lug groove 341 of the outer second land portion 34.

The bent portion 231 is formed by the center side edge portion being bent in the direction toward outside in the groove width direction of the circumferential main groove 23 at the position where the positions of the center side edge portion are different in the tire lateral direction. Specifically, due to the position of the circumferential main groove 23 in the tire lateral direction is shifted at a predetermined position in the tire circumferential direction, the position of the center side edge portion in the tire lateral direction is also shifted, the center side edge portion has a portion to be positioned on the center land portion 33 side, and a portion to be positioned on the outer second land portion 34 side, at a position where the position of the circumferential main groove 23 is shifted in the tire lateral direction. Namely, the center side edge portion has the inner center side edge portion 232b which is a portion to be positioned on the center land portion 33 side and the outer center side edge portion 232a which is a portion to be positioned on the outer second land portion 34 side at a position where the position of the circumferential main groove 23 is shifted in the tire lateral direction. Of the outer center side edge portion 232a and the inner center side edge portion 232b, the inner center side edge portion 232b is positioned further inside in the tire lateral direction than the outer center side edge portion 232a at a position where the center side edge portion is shifted in the tire lateral direction.

The bent portion 231 is formed by the center side edge portion being bent from the outer center side edge portion 232a to the direction oriented to the circumferential main groove 23 groove width direction outside, and the portion oriented to the circumferential main groove 23 groove width direction outside forms the edge portion 2311 of the bent portion. Namely, the outer center side edge portion 232a and the inner center side edge portion 232b at the center side edge portion are connected by the bent portion edge portion 2311.

The bent portion edge portion 2311 thus formed is inclined in the tire circumferential direction with respect to the tire lateral direction toward the side on which the outer center side edge portion 232a is located, from the outer center side edge portion 232a to the circumferential main groove 23 groove width direction outside, namely, from the outer second land portion 34 side to the center land portion 33 side. In other words, in the bent portion edge portion 2311, the inner end portion 2312 which is the end portion connected to the inner center side edge portion 232b, is inclined further toward the side where the outer center side edge portion 232a is positioned in the tire circumferential direction than the outer end portion 2313 which is the end portion connected to the outer center side edge portion 232a. Accordingly, the bent portion edge portion 2311 is formed in a shape bent with respect to the outer center side edge portion 232a with the bending angle γ being an acute angle. Namely, the bent portion 231 is formed such that the bending angle γ of the bending center side edge portion is an acute angle. The bending angle γ of the bent portion 231 is within the range 40 degrees≤γ≤85 degrees, and more preferably within the range 60 degrees≤γ≤75 degrees.

A part of the lug grooves 341 out of the plurality of lug grooves 341 extending outward in the tire lateral direction from the circumferential main groove 23 is connected to a position in the circumferential main groove 23 in the vicinity of the bent portion 231, namely, the opening portion to the direction main groove 23 is connected to the circumferential main groove 23 at a position facing the bent portion 231. The intersection point where the lug groove 341 is connected to the position in the vicinity of the bent portion 231 in the circumferential main groove 23 is formed as a three-way intersection point PC from which grooves extend in three directions which are two directions of the circumferential main groove 23 and one direction of the lug grooves 341.

Describing a manner in which the lug grooves 341 are connected to the circumferential main grooves 23 at the three-way intersection point PC, similar to the center side edge portion, a position of the second side edge portion in the tire lateral direction is also shifted due to the position of the circumferential main groove 23 being shifted at a predetermined position in the tire circumferential direction. Accordingly, the second-side edge portion has the inner second-side edge portion 233b which is the portion to be positioned on the center land portion 33 side, and the outer second-side edge portion 233a which is the portion to be positioned on the outer second land portion 34 side at a position where the position of the circumferential main groove 23 in the tire lateral direction is shifted.

The lug groove 341 connected to the circumferential main grooves 23 at the three-way intersection point PC is connected to the second side edge portion at a position where the position of the circumferential main groove 23 in the tire lateral direction is shifted. Accordingly, out of the edges on both sides in the groove width direction of the lug groove 341, one edge is connected to the outer second side edge portion 233a, and the other edge is connected to the inner second side edge portion 233b. Since the outer second side edge portion 233a and the inner second side edge portion 233b are positioned at different positions in the tire lateral direction, the lug grooves 341 connected to the circumferential main grooves 23 with both edges in the groove width direction being separated into the outer second side edge portion 233a and the inner second side edge portion 233b has the opening portion to the circumferential main groove 23 inclined with respect to the tire lateral direction. The opening portion of the lug groove 341 to the circumferential main groove 23 is accordingly oriented to the direction of the bent portion 231 formed on the center side edge portion side of the circumferential main groove 23, and formed at a position facing the bent portion 231.

Note that, the opening portion of the lug groove 341 in this case refers to a region connecting the intersection point of one edge of the lug groove 341 and the outer second side edge portion 233a of the circumferential main groove 23 and the intersection point of the other edge of the lug groove 341 and the inner second side edge portion 233b of the circumferential main groove 23. Also, in this case, that the opening portion of the lug groove 341 faces the bent portion 231 refers to the state that at least part of the bent portion edge portion 2311 of the bent portion 231 is positioned in the region having the width of and perpendicularly intersecting with the opening portion.

Figure 9:
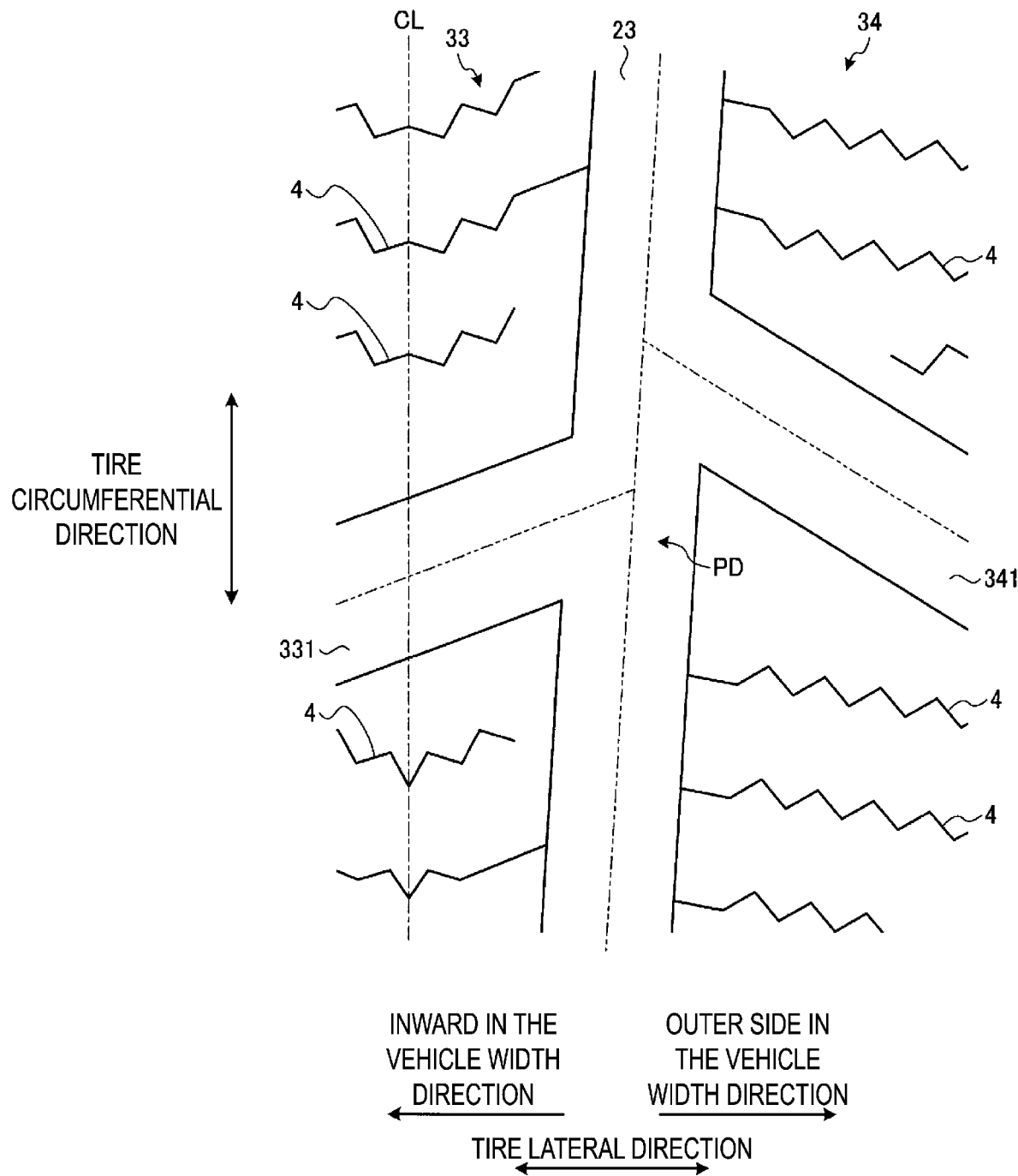
FIG. 9 is an enlarged view illustrating a part of the outer center circumferential main groove described in FIG. 7.

FIG. 9 is an enlarged view illustrating a part of the outer center circumferential main groove illustrated in FIG. 7. This drawing illustrates an enlarged view of the four-way intersection point PD of the outer center circumferential main groove 23, the lug groove 331 of the center land portion 33 and the lug groove 341 of the outer second land portion 34.

Further, out of the plurality of lug grooves 341, some of the other is connected to the vicinity of the portion where the lug groove 331 extending inward in the tire lateral direction from the circumferential main groove 23 is connected to the circumferential main groove 23. The lug grooves 341 connected to the vicinity of the portion where the lug groove 331 is connected to the circumferential main groove 23, is connected to the second side edge portion of the circumferential main groove 23, that is similar to the lug grooves 341 connected to the circumferential main groove 23 at the three-way intersection point PC. The intersection point at which the lug groove 331 is connected to the center side edge portion side of the circumferential main groove 23 and the lug groove 341 is connected to the second side edge portion side of the circumferential main groove 23 is formed as the four-way intersection point PD extending in the total of four directions which are the two directions of the circumferential main groove 23, and the respective directions of the lug groove 331 and the lug groove 341.

The lug groove 341 connected to the circumferential main groove 23 at the four-way intersection point PD includes the opening portion to the circumferential main grooves 23 being connected to the position overlapping in at least some range in the tire circumferential direction with the opening portion of the lug grooves 331 to the circumferential main grooves 23. Namely, the opening portion of the lug groove 341 to the circumferential main groove 23 and the opening portion of the lug groove 331 to the circumferential main groove 23 are overlapped at least in some range when viewed in the tire lateral direction, and at least some range of the both opening portions are facing each other.

A plurality of four-way intersection points PD and a plurality of three-way intersection points PC formed in this manner respectively on the circumferential main groove 23 are arranged alternately in the tire circumferential direction on the circumferential main groove 23.

Figure 10:
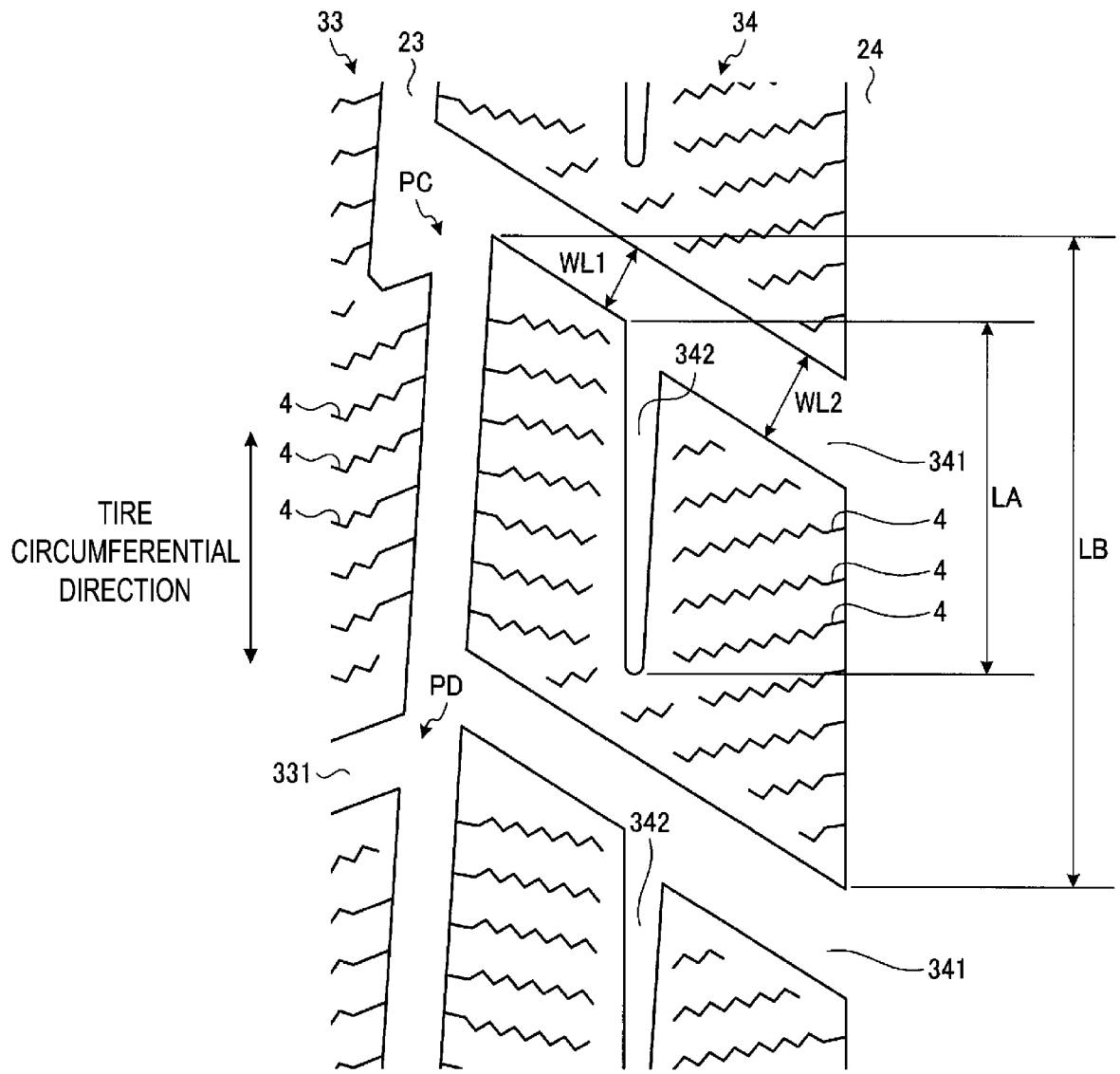
FIG. 10 is an enlarged plan view illustrating an outer second land portion of the pneumatic tire illustrated in FIG. 7.

FIG. 10 is an enlarged plan view illustrating an outer second land portion illustrated in FIG. 7.

A plurality of lug grooves 341 formed between the circumferential main grooves 23 and the outermost circumferential main grooves 24 are inclined in the circumferential direction of the tire while extending in the tire lateral direction, and the inclination angles are substantially the same across all of the lug grooves 341. For this reason, the outer second land portion 34, which is partitioned by the lug grooves 341 on both sides in the circumferential direction of the tire and is defined by the circumferential main grooves 23 and the outermost circumferential main grooves 24 on each side in the tire lateral direction, is in a substantially parallelogram shape.

In the outer second land portion 34 formed in this manner, a circumferential narrow groove 342 extending in the tire circumferential direction and having one end connected to the lug groove 341 and the other end terminating within the outer second land portion 34 is formed. The circumferential narrow groove 342 is formed in the vicinity of the center of the outer second land portion 34 in the tire lateral direction, is connected to one of the two lug grooves 341 defining both sides of the outer second land portion 34 in the tire circumferential direction, and extends in the tire circumferential direction from the lug groove 341. The circumferential narrow groove 342 formed in each of the plurality of outer second land portions 34 is connected to the lug grooves 341 located on the same direction side in the tire circumferential direction in each outer second land portion 34, and extends into the outer second land portion 34.

The circumferential narrow groove 342 extending in the tire circumferential direction in this manner has a length LA in the tire circumferential direction within a range from 50% to 90% of the total length LB in the tire circumferential direction of the outer second land portion 34. Namely, the relationship between the length LA of the circumferential narrow groove 342 and the total length LB of the outer second land portion 34 in the tire circumferential direction is within the range $0.50 \leq (LA/LB) \leq 0.90$. The length LA of the circumferential narrow grooves 342 in this case is, the distance in the tire circumferential direction between the end portion that is most distant in the circumferential direction, out of the end portions of the circumferential narrow grooves 342 on the side connected to the lug grooves 341, and the end on the side terminating in the outside second land portion 34. The total length LB in the tire circumferential direction of the outer second land portion 34 is the distance in the tire circumferential direction between one end portion and the other end portion of the outer second land portions 34. In addition, the length LA of the circumferential narrow groove 342 is preferably within a range from 60% to 80% with respect to the total length LB of the outer second land portion 34.

Further, the width of the circumferential narrow groove 342 is wider at the end portion on the side connected to the lug groove 341 than at the end portion on the side terminating within the outer second land portion 34. Namely, the groove width of the circumferential narrow groove 342 gradually increases from the end portion on the side terminating within the outer second land portion 34 to the end portion on the side connected to the lug groove 341, or the groove width gradually narrows from the end portion on the side connected to the lug groove 341 to the end portion on the side terminating within the outer second land portion 34. Namely, the circumferential narrow groove 342 is formed in a tapered shape.

The edge of the lug groove 341 on the side to which the circumferential narrow groove 342 is connected is shifted in the groove width direction of the lug groove 341 between both sides in the tire lateral direction at the position where the circumferential narrow groove 342 is connected. More specifically, the edge on the side to which the circumferential narrow groove 342 is connected in the lug groove 341 is formed being shifted, with respect to the portion positioned on the circumferential main groove 23 side, shifted in a direction to make the groove width of the lug groove 341 broader in the portion located on the outermost circumferential main groove 24 side than in the portion located on the circumferential main groove 23 side in the tire lateral direction from where the circumferential narrow groove 342 is connected. Accordingly, the groove wall of the circumferential narrow groove 342 is shifted in the longitudinal direction of the circumferential narrow groove 342 in the vicinity of the opening portion of the circumferential narrow groove 342 opening to the lug groove 341, and the opening portion of the circumferential narrow groove 342 is opened in a state that the groove walls on both sides in the groove width direction are shifted from each other.

Regarding the amount of shift in the edge of the lug groove 341, the relationship between the groove width WL1 of the portion positioned further on the circumferential main groove 23 side than the position where the circumferential narrow groove 342 is connected in the lug groove 341 and the groove width WL2 of the portion positioned on the outermost circumferential main groove 24 side is preferably in the range $0.60 \leq (WL1/WL2) \leq 0.90$.

When a pneumatic tire 1 configured in this manner is mounted on a vehicle and driven, the pneumatic tire 1 is rotated while the tread surface located at the bottom out of the tread surface comes into contact with the road surface. When a vehicle mounted with the pneumatic tire 1 travels on dry road surfaces, the vehicle travels mainly due to the driving force and the braking force being transmitted to the road surface and the turning force being generated by the frictional force between the tread surface and the road surface. Further, when traveling on wet road surfaces, water between the tread surface and the road surface goes into the circumferential main grooves, the lug grooves or the like, and the vehicle travels while the water is drained between the tread surface and the road surface with these grooves. This makes it easy for the tread surface to contact the road surface, enabling the vehicle to travel due to the frictional force between the tread surface and the road surface.

In addition, when traveling on snow-covered road surfaces, the pneumatic tire 1 compresses the snow on the road surface with the tread surface, while snow on the road surface enters into the circumferential main grooves or the lug grooves also resulting in a compressed state in the grooves. In this state, acting of a driving force or a braking force on the pneumatic tire 1 or acting of a force in the tire lateral direction due to the turning of the vehicle generates a so-called snow column shearing force which is a shear force acting on the snow in the groove. Generation of resistance due to the snow column shearing force between the pneumatic tire 1 and the road surface enables the driving force and the braking force to be transmitted to the snow-covered road surfaces, enabling the vehicle to travel on the snow-covered road surfaces.

Also, when traveling on snow-covered road surfaces or on icy road surfaces, the vehicle travels also using the edge effect of the circumferential main groove, the lug groove, and the sipe 4. Namely, when traveling on snow-covered road surfaces or icy road surfaces, traveling of the vehicle also uses the resistance by the edge portion of the circumferential main groove or the edge of the sipe 4 being caught on the snow surface or the ice surface. Also, when traveling on icy road surfaces, water on the icy road surface is taken in by the sipe 4 to remove the water film between the icy road surface and the tread surface, to facilitate contact between the icy road surface and the tread surface. The resistance between the tread surface and the icy road surface is accordingly increased due to the frictional force and the edge effect, and the traveling performance of the vehicle equipped with the pneumatic tire 1 can be ensured.

As traveling on snow covered surfaces uses a lot of snow column shearing force, to improve snow column shearing force is effective for improving performance on snow. A general approach for improving the snow column shearing force is to provide many intersections that open to grooves in four directions like the four-way intersection point PD, in order to secure a region in a groove in which snow can be firmly compressed. However, configuring the tread pattern only with intersection points that open to four directions makes the size of each land portion small, and lowers the block rigidity making it difficult to ensure steering stability on snow or ice. On the other hand, to ensure the block rigidity, configuring the tread pattern only with intersection points that open to three directions by connecting an end portion of a lug groove to the circumferential main groove enables the block rigidity to be ensured, but makes it difficult to improve the snow column shearing force since the volume of snow entering into the intersection point is small.

A preferable shape of groove intersection point for transmitting driving force and braking force on snow, and a preferable shape of groove intersection point for steering stability on snow or on ice is incompatible in this manner. Thus, the pneumatic tire 1 according to this embodiment includes the bent portion 231 provided in the circumferential main groove 23, and the lug groove 341 is connected to the circumferential main groove 23 at a position where the opening portion to the circumferential main groove 23 faces the bent portion 231. Thus, the snow column shearing force is improved without lowering the block rigidity. Namely, the groove area at the three-way intersection point PC can be made larger by shifting the position of the circumferential main groove 23 in the tire lateral direction at a plurality of predetermined positions in the circumferential direction of the tire to form the bent portion 231, and connecting the lug grooves 341 to the circumferential main grooves 23 such that the opening portion opens to the bent portion 231, accordingly allowing a lot of snow to enter the three-way intersection point PC. This increases snow column shearing force, allowing performance on snow to be improved.

In addition, since the area into which snow can enter is increased by forming the bent portion 231 without increasing the grooves themselves in increasing the area into which snow can enter, the center land portion 33, defined by the center side edge portion of the circumferential main groove 23 which is the edge portion on the side where the bent portion 231 is formed, can be suppressed from becoming smaller. Accordingly, the block rigidity of the center land portion 33 can be prevented from lowering, and the steering stability on snow or on ice can be improved. As a result, performance on snow and steering stability can be achieved in a compatible manner.

Further, the snow column shearing force at the intersection point PC can be ensured without reducing the block rigidity around the bent portion 231 in the center land portion 33, since the bending angle γ of the bent portion 231 is within the range 40 degrees $\leq \gamma \leq$ 85 degrees. Namely, when the bending angle γ is less than 40 degrees, it makes the angle of the bent portion edge portion 2311 with respect to the outer center side edge portion 232a too small, and the block rigidity in the vicinity of the bent portion 231 in the center land portion 33 may be decreased. When the bending angle γ is greater than 85 degrees, it makes the angle of the bent portion edge portion 2311 with respect to the outer center side edge portion 232a too large, and it may make it difficult to ensure the groove area at the three-way intersection point PC, and make it difficult to ensure snow column shearing force. On the other hand, when the bending angle γ of the bent portion 231 is configured within the range 40 degrees≤γ≤85 degrees, snow column shearing force at the three-way intersection point PC can be ensured while suppressing the decrease in the block rigidity around the bent portion 231. As a result, performance on snow and steering stability can be more reliably achieved in a compatible manner.

Further, since the groove depth Hn of the circumferential main groove 23 is configured within a range 0.25 Hm≤Hn≤1.00 Hm with respect to the groove depth Hm of the outermost circumferential main groove 24 in which the tread wear indicator 241 is provided, snow column shearing force can be ensured without lowering the block rigidity. Namely, when the relationship between the groove depth Hn of the circumferential main groove 23 and the groove depth Hm of the outermost circumferential main groove 24 is Hn<0.25 Hm, the volume of the circumferential main groove 23 including the three-way intersection point PC becomes small, and the amount of snow entering the three-way intersection point PC and the circumferential main groove 23 is decreased, which may make it difficult to ensure the snow column shearing force. When the relationship between the groove depth Hn of the circumferential main groove 23 and the groove depth Hm of the outermost circumferential main groove 24 is Hn>Hm, the groove depth Hn of the circumferential main groove 23 becomes too deep and the block rigidity of the center land portion 33 and the outer second land portion 34 may tend to decrease. On the other hand, if the groove depth Hn of the circumferential main groove 23 is configured within the range 0.25 Hm≤Hn≤1.00 Hm with respect to the groove depth Hm of the outermost circumferential main groove 24, the snow column shearing force at the three-way intersection point PC and the circumferential main groove 23 can be ensured while suppressing the decrease in the block rigidity of the center land portion 33 and the outer second land portion 34. As a result, performance on snow and steering stability can be more reliably achieved in a compatible manner.

In addition, since the groove width Wn of the circumferential main groove 23 is within the range 3 mm≤Wn≤10 mm, it is possible to ensure the snow column shearing force without decreasing the block rigidity. Namely, when the groove width Wn of the circumferential main groove 23 is less than 3 mm, since the groove width Wn is too narrow, the amount of snow entering the circumferential main groove 23 decreases, and securing of the snow column shearing force may become difficult. Further, when the groove width Wn of the circumferential main groove 23 exceeds 10 mm, the groove width Wn becomes too wide, and the block rigidity of the center land portion 33 and the outer second land portion 34 may tend to be decreased. On the other hand, when the groove width Wn of the circumferential main groove 23 is within the range 3 mm≤Wn≤10 mm, the snow column shearing force in the circumferential main grooves 23 can be ensured while suppressing the decrease in the block rigidity of the center land portion 33 and the outer second land portion 34. As a result, performance on snow and steering stability can be more reliably achieved in a compatible manner.

In addition, since the three-way intersection points PC and the four-way intersection points PD are alternately arranged in the tire circumferential direction, the snow column shearing force can be improved by the four-way intersection point PD, and the tread pattern can be configured in which the block rigidity and the snow column shearing force are balanced. As a result, performance on snow and steering stability can be more reliably achieved in a compatible manner.

In addition, since the circumferential narrow groove 342 is formed in the outer second land portion 34, the snow column shearing force can be more reliably ensured by the circumferential narrow groove 342. In addition, since one end portion of the circumferential narrow groove 342 terminates in the outer second land portion 34, decrease in the block rigidity can be suppressed while securing the snow column shearing force. As a result, performance on snow and steering stability can be more reliably achieved in a compatible manner.

Since the circumferential narrow groove 342 has a length LA in the tire circumferential direction within a range from 50% to 90% of the total length LB in the tire circumferential direction of the outer second land portion 34, the snow column shearing force can be ensured while suppressing the decrease in the block rigidity. Namely, when the length LA of the circumferential narrow groove 342 is less than 50% of the total length LB of the outer second land portion 34, the length LA of the circumferential narrow groove 342 is too short with respect to the outer second land portion 34, and may make it difficult for the circumferential narrow grooves 342 to ensure the snow column shearing force. When the length LA of the circumferential narrow groove 342 exceeds 90% of the entire length LB of the outer second land portion 34, the length LA of the circumferential narrow groove 342 is too long with respect to the outer second land portion 34, and the block rigidity of the outer second land portion 34 may tend to be lowered. On the other hand, when the length LA of the circumferential narrow groove 342 is within the range from 50% to 90% of the total length LB of the outer second land portion 34, the snow column shearing force in the circumferential narrow groove 342 can be ensured while suppressing the decrease in the block rigidity of the outer second land portion 34. As a result, performance on snow and steering stability can be more reliably achieved in a compatible manner.

Further, since the groove width of the circumferential narrow groove 342 is wider at the end portion on the side connected to the lug groove 341 than at the end portion on the side terminating within the outer second land portion 34, the snow column shearing force in the portion on the side of the circumferential narrow groove 342 connected to the outer second land portion 34 can be ensured while suppressing the lowering of the block rigidity of the outer second land portion 34. As a result, performance on snow and steering stability can be more reliably achieved in a compatible manner.

In addition, the edge effect in the lug groove 341 and the circumferential narrow groove 342 can be enhanced, due to, on the side of edge of the lug groove 341 to which the circumferential narrow groove 342 is connected, the edges on both sides in the tire lateral direction at the position where the circumferential narrow groove 342 is connected being shifted in the groove width direction of the lug groove 341. Namely, due to the edge of the lug groove 341 being shifted in the lug groove 341 groove width direction, the ground contact position in the tire circumferential direction of the edge changes between both sides of the position where the circumferential narrow groove 342 is connected to the lug groove 341, allowing the edge effect in the tire circumferential direction to be enhanced. In addition, due to the edge of the lug groove 341 being shifted, one groove wall out of the groove walls on both sides of the circumferential narrow groove 342 can be made to easily exposed in the tire lateral direction, and the edge effect on the wall surface on the exposed side of the wall surface of the circumferential narrow grooves 342 can be enhanced, enhancing the edge effect in the tire lateral direction accordingly. As a result, steering stability is improved more reliably.

Note that, in the pneumatic tire 1 according to the above-described embodiment, the bent portion 231 of the circumferential main groove 23 is provided on each side of the tire equatorial plane CL in the tire lateral direction, namely, the three-way intersection points PC are provided on both sides of the tire equatorial plane CL in the tire width direction, but the three-way intersection point PC may be provided in any of the either side of the tire lateral direction. Namely, the three-way intersection point PC having the bent portion 231 may be provided, in the case that the pneumatic tire 1 is mounted on the vehicle, only on the tire equatorial plane CL inner side in the mounting direction to the vehicle, or only on the tire equatorial plane CL outer side in the mounting direction to the vehicle.

In addition, the pneumatic tire 1 according to the above-described embodiment includes the bent portion 231 provided at the center-side edge portion which is the edge portion on the inner side in the tire lateral direction out of the edge portions of the circumferential main groove 23, but the bent portion 231 may be provided at the edge portion on the outer side in the tire lateral direction. In a case that the bent portion 231 is provided at the edge portion on the outer side in the tire lateral direction of the circumferential main groove 23, snow column shearing force can be ensured while suppressing lowering of the block rigidity, by the center land portion 33 serving as the outer second land portion, the lug groove 331 serving as the outer second lug groove, the lug groove 331 being connected to the edge portion on the opposite side to the edge portion on the side where the bent portion 231 is provided in the circumferential main groove 23, and the opening portion being formed to face the bent portion 231.

In addition, the pneumatic tire 1 according to the above-described embodiment includes the bent portion 231 provided in the circumferential main groove 23. However, the outer center circumferential main groove to be provided with the bent portion 231 is not limited to the circumferential main groove 23. The outer center circumferential main groove to be provided with the bent portion 231 may be any outer center circumferential main groove extending in the tire circumferential direction, regardless of relative positional relationship with other outer center circumferential main grooves.

Further, the pneumatic tire 1 according to the above-described embodiment includes the three-way intersection point PC and the four-way intersection point PD alternately provided in the tire circumferential direction, but the three-way intersection PC and the four-way intersection PD do not have to be alternately provided. With regard to the three-way intersection point PC and the four-way intersection point PD, a plurality of three-way intersection points PC may be provided between a four-way intersection point PD and another four-way intersection points PD, or conversely, a plurality of four-way intersection points PD may be provided between a three-way intersection point PC and another three-way intersection points PC. The three-way intersection point PC and the four-way intersection point PD are preferably arranged appropriately according to the on-snow performance and the steering stability required of the pneumatic tire 1.

Further, the pneumatic tire 1 according to the above-described embodiment includes the end portions of the circumferential narrow grooves 342 to be connected to the lug groove 341 all connected to the circumferential narrow grooves 342 on the same side in the tire circumferential direction. However, the end portions of the circumferential narrow grooves 342 to be connected to the lug groove 341 may be different for each of the circumferential narrow grooves 342.

In the edge of the lug groove 341 on the side to which the circumferential narrow groove 342 is connected, the portion of the edge located on the outermost circumferential main grooves 24 side than the portion of the edge located on the circumferential main groove 23 side in the tire lateral direction with respect to the position where the circumferential narrow groove 342 is connected is formed to shift in the direction in which the groove width of the lug groove 341 is wider, but how the edge is shifted may be reversed. Namely, in the edge of the lug groove 341 on the side to which the circumferential narrow groove 342 is connected, the portion of the edge located on the circumferential main groove 23 side than the portion of the edge located on the outermost circumferential main grooves 24 side in the tire lateral direction with respected to the position where the circumferential narrow groove 342 is connected may be formed to shift in the direction in which the groove width of the lug groove 341 is wider. In the lug groove 341, it suffices when the portions of edges are shifted relative to each other in the groove width direction of the lug groove 341 at positions on both sides in the tire lateral direction of a portion to which the circumferential narrow groove 342 is connected, regardless of how the portions of edges are relatively shifted.

Tread Characteristic

In the pneumatic tire 1, the snow traction index (so-called 0 degrees snow traction index) STI_in for the tire circumferential direction of the inner second land portion 32, and the snow traction index STI_out for the tire circumferential direction of the outer second land portion 34 have the relationship STI_out<STI_in. Accordingly, the snow traction index STI_in for the inner second land portion 32 in the vehicle width direction inner region is configured to be large. Also, the snow traction indices STI_in and STI_out are preferably in the range 15≤STI_in ≤25 and 13≤STI_out≤23. In addition, the snow traction indices STI_in and STI_out preferably satisfy the condition of 2≤STI_in −STI_out. With such a configuration, since the edge effect in the inner region in the vehicle width direction is relatively increased, the performance on ice of the tire is efficiently improved. At the same time, since the rigidity in the outer region in the vehicle width direction is relatively increased, the handling stability on snow is efficiently improved. Accordingly, performance on ice and performance on snow are compatible at a high level.

The snow traction index STI is an empirical formula by Uniroyal Inc. proposed by the Society of Automotive Engineers (SAE) and is defined by the following Mathematical Formula (1). In the Formula, Pg is a groove density (1/mm) and is calculated as a ratio between the groove length (mm) of all the grooves (all grooves except sipes) projected in the tire circumferential direction on the tire ground contact surface and the tire ground contact area (product of the tire ground contact width and tire circumferential length) (mm^2). Furthermore, Dg is an average value of the groove depth (mm) of all the grooves projected in the tire circumferential direction on the tire ground contact surface.

$$STI = -6.8 + 2202 \times Pg + 7.6 \times Dg \qquad (1)$$

In addition, the collapse index δ_in of the blocks 323A, 323B (see FIG. 3) of the inner second land portion 32, and the collapse index δ_out of the block of the outer second land portion 34 (see FIG. 7) have the relationship δ_out<δ_in. Accordingly, the collapse index δ_in of the inner second land portion 32 in the vehicle width direction inner region is configured large. Also, the collapse indices δ_in and δ_out preferably satisfy the condition of 1.15≤δ_in/δ_out, and more preferably satisfy the condition of 1.20≤δ_in/δ_out. With such a configuration, since the compliance of the blocks 323A and 323B in the vehicle width direction inner region is relatively increased, the performance on ice of the tire is efficiently improved. At the same time, since the rigidity in the outer region in the vehicle width direction is relatively increased, the handling stability on snow is efficiently improved. Accordingly, performance on ice and performance on snow are compatible at a high level.

The collapse index δ of the block is defined by the following Mathematical Formula (2). In the Formula, Dg is the average groove depth (mm) around the block, ΣLs is the sum of projected lengths (mm) in the tire circumferential direction of the sipes arranged in the block, Ds is the average sipe depth (mm) arranged in the block, T is the rubber hardness at room temperature (JIS (Japanese Industrial Standard)-A hardness according to JIS-K6253) of the main compound constituting the block, and S is a cross-sectional area (mm) of a block in a cross section perpendicular to the tire circumferential direction. Generally, the smaller the collapse index δ, the higher the rigidity of the block.

Mathematical Formula 2

$$\delta \propto \frac{(Dg)^3 \times \left(\sum Ls \times (Ds)^2\right)}{(T)^2 \times (S)} \quad (2)$$

Further, the groove area ratio A_in of the inner region in the vehicle width direction bounded by the tire equatorial plane CL and the groove area ratio A_out of the outer region in the vehicle width direction have the relationship A_in<A_out. Accordingly, the groove area ratio A_in of the inner region in the vehicle width direction is configured small. Also, the groove area ratios A_in and A_out are preferably in the range 23%≤A_in≤33% and 28%≤A_out≤38%. In addition, the groove area ratios A_in and A_out preferably satisfy the condition of 1%≤A_out−A_in, and more preferably satisfy the condition of 5%≤A_out−A_in. Further, a groove surface area ratio of the entire tread pattern is preferably in a range from 25% to 35%. With such a configuration, since the groove area ratio A_in of the vehicle width direction inner region is relatively small, the ground contact area of the inner region in the vehicle width direction increases and the braking performance on ice is efficiently improved. Further, since the groove area ratio A_out in the outer region in the vehicle width direction is relatively large, the shearing effect in the snow in the outer region in the vehicle width direction is efficiently improved, and the steering stability performance on snow of the tire is efficiently improved.

Groove area ratio is defined in each land portion as: groove area/(groove area+ground contact area). "Groove area" refers to the opening area of the grooves at the ground contact surface. In addition, "groove" refers to a lug groove and a notch portion formed in the land portion, and does not include a circumferential groove, sipe, kerf, and the like of the tread portion. Ground contact area refers to the contact area between the tire and the road surface. Additionally, the groove area and the ground contact area are measured at a contact surface between a tire and a flat plate when the tire is mounted on a specified rim, inflated to the specified internal pressure, placed vertically on the flat plate in a static state, and loaded with a load corresponding to the specified load.

Shoulder Land Portion Circumferential Recess

As illustrated in FIG. 2, the left and right shoulder land portions 31, 35 include a plurality of lug grooves 311, 351, and a plurality of blocks (reference numerals omitted in the drawing) defined by these lug grooves 311 and 351. Also, these blocks have circumferential recessed portions 312, 352 respectively. The circumferential recessed portions 312, 352 extend in the circumferential direction of the tire, open to the lug groove at one end portion and terminate within the block at the other end portion. In such a configuration, the ground contact pressure of the shoulder land portions 31, 35 is reduced by the circumferential recessed portions 312, 352, and the ground contact pressure of the second land portions 32, 34 is relatively increased. Accordingly, the effect of improving the performance on ice and the performance on snow by the second land portions 32, 34 can be efficiently obtained.

Further, in the above configuration, the blocks of the shoulder land portions 31, 35 preferably have a plurality of sipes 4 (see FIG. 3), and these sipes 4 preferably extend in the tire lateral direction without intersecting the circumferential recessed portions 312 and 352 (See FIG. 2). Further, the depth of the sipe 4 is preferably in the range from 3.0 mm to 8.0 mm, and the depth of the circumferential recessed portions 312, 352 is preferably in the range from 0.5 mm to 3.0 mm. Further, the difference in these depths is preferably 1.0 mm or greater. Accordingly, the effect of the shoulder land portions 31, 35 contributing to performance on ice and performance on snow is properly ensured.

For example, in the configuration of FIG. 2, the left and right shoulder land portions 31, 35 include the circumferential recessed portions 312, 352 respectively at the central portion of the ground contact regions between the outermost circumferential main grooves 21, 24 and the tire ground contact edge T. In addition, the circumferential recessed portions 312, 352 have a straight shape extending in the tire circumferential direction and a constant opening width. In addition, the outer shoulder land portion 35 includes the circumferential recessed portions portion 352 opening to the lug groove 351 at the end portion on the same side as the circumferential narrow groove 342 of the outer second land portion 34. Further, the left and right shoulder land portions 31, 35 are respectively provided with a plurality of sipes 4 in right and left regions defined by the circumferential recessed portions 312, 352. Further, each sipe 4 does not communicate with the circumferential recessed portions 312, 352, but terminates within the block at a predetermined distance to the circumferential recessed portions 312, 352.

Note that, in the configuration of FIG. 2, as described above, the left and right shoulder land portions 31, 35 include the circumferential recessed portions 312, 352, respectively, but the present technology is not limited thereto, and only one out of the shoulder land portions 31, 35 may include the circumferential recessed portions 312, 352 (not illustrated). Further, the circumferential recessed portions 312, 352 may extend through the blocks of the shoulder land portions 31, 35 in the tire circumferential direction (not illustrated).

Effects

As described above, the pneumatic tire 1 includes four or more circumferential main grooves 21 to 24 extending in the tire circumferential direction, and five or more land portions 31 to 35 defined by the circumferential main grooves 21 to 24 (see FIG. 2). Further, in the region on the inner side in the vehicle width direction with the tire equatorial plane CL as a boundary, the inner second land portion 32 includes the circumferential narrow groove 321 extending in the tire circumferential direction, and a plurality of sets of first lug grooves 322A and second lug grooves 322B extending through the narrow groove 321 extending in the tire lateral direction. In addition, the first lug grooves 322A are opened at the edge portion on the side of the tire ground contact edge T of the inner second land portion 32 at one end portion and terminate at the other end portion inside the inner second land portion 32. The second lug groove 322B opens at the edge portion of the inner second landing portion 32 on the tire equatorial plane CL side at one end portion and terminates inside the inner second land portion 32 at the other end portion. Then, the first lug grooves 322A and the second lug grooves 322B are alternately arranged in the tire circumferential direction. At the same time, in the region on the outer side in the vehicle width direction, the circumferential main groove 23 on the tire equatorial plane CL side that partitions the outer second land portion 34 includes a bent portion 231 (see FIG. 7) having a bent shape with amplitude in the tire lateral direction and an acute angle of bending at the edge portion on the tire equatorial plane CL side. In addition, the outer second land portion 34 is provided with a lug groove 341 that opens at a position facing the bent portion 231.

In such a configuration, (1) in the vehicle width direction inner region, since the inner second land portion 32 includes the first lug grooves 322A and the second lug grooves 322B extending in the tire lateral direction, extending through the circumferential narrow groove 321, and opening in the circumferential main grooves 21 and 22 respectively, a larger number of intersecting portions of the grooves are provided increasing the groove volume, accordingly enhancing the snow column shearing force and snow discharge properties of the land portion 32 on snow-covered road surfaces. In addition, since the other end portions of the first lug groove 322A and the second lug groove 322B respectively terminate within the land portion 32, the ground contact area of the land portion 32 is ensured and the adhesion frictional force on the icy road surface is ensured. Such a configuration is advantageous in that performance on snow and performance on ice of tire are achieved in a compatible manner.

Further, (2) in the vehicle width direction inner region, since the first lug grooves 322A and the second lug grooves 322B of the inner second land portion 32 are alternately arranged in the tire circumferential direction, the first lug grooves 322A and the second lug grooves 322B alternately open to the left and right edge portions of the land portion 32. Accordingly, the edge effect of the lug grooves 322A, 322B during vehicle turning is improved as compared with a configuration (not illustrated) in which a plurality of lug grooves open only to one side edge portion of the land portion. This has the advantage of the tire snow performance being improved especially on icy road surfaces.

In addition, (3) in the outer side region in the vehicle width direction, since the outer second land portion 34 includes the lug groove 341 opening to the position facing the bent portion 231 while the circumferential main groove 23 includes the bent portion 231 at the edge portion on the tire equatorial plane CL side, the groove volume of the circumferential main groove 23 at the crossing position with the lug groove 341 (three-way intersection point PC) increases (see FIG. 7). Thus, the shearing effect in the snow of the vehicle width direction outer region is improved, which has the advantage that the snow performance of the tire is improved.

Further, (4) in the outer side region in the vehicle width direction, since the bent portion 231 of the circumferential main groove 23 has a sharp bending angle, there is an advantage that the shearing effect in the snow by the bent portion 231 is improved and the performance on snow of the tire is improved.

According to the above-mentioned, there is an advantage that both the performance on ice and the performance on snow of the tire are improved. For example, (A) a symmetrical tread pattern having the configuration of the vehicle width direction inner region in FIG. 2 on the left and right of the tire remarkably improves the braking performance on ice and the turning performance on ice by the effect described above. However, it is difficult to obtain an improvement effect on the braking performance on snow, and the improvement effect on the steering stability performance on snow is small. (B) The symmetrical tread pattern according to the configuration of the vehicle width direction outer region in FIG. 2, provided on the left and right sides of the tire, remarkably improves the braking performance on snow and the steering stability performance on snow by the above-described effects. However, it is difficult to obtain the effect of improving braking performance on ice and turning performance on ice.

In addition, in the pneumatic tire 1, snow traction index STI_in in the tire circumferential direction of the inner second land portion 32 and snow traction index STI_out in the tire circumferential direction of the outer second land portion 34 have the relationship STI_out<STI_in. With such a configuration, since the edge effect in the inner region in the vehicle width direction is relatively increased, the performance on ice of the tire is efficiently improved. At the same time, since the rigidity in the outer region in the vehicle width direction is relatively increased, the handling stability on snow is efficiently improved. This has the advantage that both performance on ice and performance on snow are compatible at a high level.

In the pneumatic tire 1, the snow traction indices STI_in and STI_out described above have the relationship 2≤STI_in −STI_out. This has the advantage that the snow traction indices STI_in and STI_out are made appropriate.

Further, the pneumatic tire 1 includes the inner second land portion 32 provided with blocks 323A and 323B which are defined by the circumferential narrow groove 321, first lug grooves 322A and second lug grooves 322B (see FIG. 3). Further, the outer second land portion 34 is provided with blocks (notation of dimension symbols in the figure omitted) defined by a plurality of lug grooves 341 (see FIG. 7). The collapse index $\delta\_in$ of the blocks 323A and 323B of the inner second land portion 32 and the collapse index $\delta\_out$ of the blocks of the outer second land portion 34 have the relationship $\delta\_in<\delta\_out$. With such a configuration, since the compliance of the blocks 323A and 323B in the vehicle width direction inner region is relatively increased, the performance on ice of the tire is efficiently improved. At the same time, since the rigidity in the outer region in the vehicle width direction is relatively increased, the handling stability on snow is efficiently improved. This has the advantage that both performance on ice and performance on snow are compatible at a high level.

In addition, in the pneumatic tire 1, collapse indices δ_in and δ_out satisfy a condition of 1.15≤δ_out/δ_in. This has the advantage that the ratio of collapse indices δ_in and δ_out is made appropriate.

Further, in the pneumatic tire 1, out of the left and right regions bounded by the tire equatorial plane CL, the groove area ratio A_in in the vehicle width direction inner region and the groove area ratio A_out in the vehicle width direction outer region have the relationship A_in<A_out. With such a configuration, since the groove area ratio A_in of the vehicle width direction inner region is relatively small, the ground contact area of the vehicle width direction inner region increases and the braking performance on ice is efficiently improved. Further, since the groove area ratio A_out in the vehicle width direction outer region is relatively large, there is an advantage that the shearing effect in the snow in the vehicle width direction outer region is efficiently improved, efficiently improving the steering stability performance on snow of the tire.

In addition, in the pneumatic tire 1, the groove area ratios A_in and A_out have the relationship 1%≤A_out−A_in. With such a configuration, since the groove area ratio A_in of the vehicle width direction inner region is relatively small, the ground contact area of the vehicle width direction inner region increases and the braking performance on ice is efficiently improved. Further, since the groove area ratio A_out in the vehicle width direction outer region is relatively large, there is an advantage that the shearing effect in the snow in the vehicle width direction outer region is efficiently improved, efficiently improving the steering stability performance on snow of the tire.

Further, the pneumatic tire 1 includes the shoulder land portions 31, 35 provided with a plurality of blocks defined by a plurality of lug grooves 311, 351 and lug grooves 311, 351 (see FIG. 2). Also, the block includes circumferential recessed portions 312, 352 extending in the circumferential direction of the tire, opening to the lug groove at one end portion, and terminating within the block at the other end portion. In such a configuration, the ground contact pressure of the shoulder land portions 31, 35 is reduced by the circumferential recessed portions 312, 352, and the ground contact pressure of the second land portions 32, 34 is relatively increased. Thus, there is an advantage that the effect of improving the performance on ice and the performance on snow by the second land portions 32, 34 can be efficiently obtained.

In addition, the pneumatic tire 1 includes the blocks of the shoulder land portions 31, 35 including the plurality of sipes 4 extending in the tire lateral direction without intersecting the circumferential recessed portions 312, 352 (see FIG. 2). Such a configuration is beneficial because performance on ice of the tire is improved by the adhesion effect of the sipes 4.

Further, in the pneumatic tire 1, the depth Hd of the circumferential recessed portions 312, 352 and the depth Hs of the sipe 4 have the relationship 1.0 mm≤Hs−Hd. Thus, there is an advantage that the depth Hd of the circumferential recessed portions 312, 352 and the depth Hs of the sipe 4 are made appropriate.

Further, the pneumatic tire 1 includes the inner second land portion 32 including a plurality of blocks 323A, 323B partitioned by the circumferential narrow groove 321, the first lug groove 322A, and the second lug groove 322B (see FIG. 3). In addition, the blocks 323A, 323B are arranged in a staggered manner in the tire circumferential direction. In such a configuration, since the blocks 323A, 323B are arranged in a staggered manner over the entire circumference of the tire, the groove edge amount can be maximized while making the block rigidity uniform. Such a configuration is beneficial because performance on ice of the tire is greatly improved.

The pneumatic tire 1 includes the first lug groove 322A and the second lug groove 322B inclined in mutually opposite directions with respect to the tire circumferential direction (see FIG. 3). In such a configuration, as compared with the configuration (not illustrated) in which all the lug grooves of the inner second land portion are inclined in the same direction, the edge effect of the lug grooves 322A, 322B at the time of vehicle turning is improved. This has the advantage of the tire turning performance being improved especially on icy road surfaces.

Further, the pneumatic tire 1 includes the center land portion 33 including a lug groove 331 that opens to the circumferential main groove 23 at a position different from the above-described bent portion 231 (see FIG. 7). In addition, the outer second land portion 34 includes the first lug groove 341 opening to a position facing the bent portion 231 and the second lug groove 341 opening to a position facing the lug groove 331 of the center land portion 33 (See FIG. 7). In such a configuration, since the lug groove 331 of the center land portion 33 and the second lug groove 341 of the outer second land portion 34 open to the same position at the circumferential main groove 23, the groove volume at this position (four-way intersection point PD) is increased and the shearing effect in the snow improves. Such a configuration is beneficial because performance on snow of the tire is improved. In particular, the block rigidity at the three-way intersection point PC described above is greater than the rigidity of the block at the four-way intersection point PD. Accordingly, in the configuration in which the three-way intersection points PC and the four-way intersection points PD are alternately arranged in the tire circumferential direction, it is possible to improve the performance on snow while securing the block rigidity as compared with the configuration including only the four-way intersection points PD.

Further, in the pneumatic tire 1, the outer second land portion 34 is provided with a block defined by a plurality of lug grooves 341 (see FIG. 7). Also, the block has a circumferential narrow groove 342 extending in the tire circumferential direction, opening at the one end portion to the lug groove 341, and terminating at the other end portion within the block. With such a configuration, the groove volume of the lug groove 341 increases at the opening portion of the circumferential narrow groove 342, and the shearing effect in the snow of the lug groove 341 increases. Such a configuration is beneficial because performance on snow of the tire is improved.

Additionally, the pneumatic tire 1 has a mounting direction indicator portion (not illustrated) for designating mounting on the inner second land portion 32 inward in the vehicle width direction. From the above-mentioned, there is an advantage that both the performance on ice and the performance on snow of the tire are improved. For example, when the pneumatic tire 1 having the tread pattern of FIG. 2 is mounted to a vehicle with the inner second land portion 32 on the outside in the vehicle width direction, although all of the braking performance on ice, the turning performance on ice, the braking performance on snow, and the steering stability performance on snow improve, a sufficient improvement effect overall cannot be obtained.

Example

FIGS. 11A-11C include a table illustrating the results of performance tests of pneumatic tires according to embodiments of the technology.

In the performance tests, a plurality of different test tires were evaluated for (1) the braking performance on ice, (2) the turning performance on ice, (3) the braking performance on snow, and (4) the steering stability performance on snow. Test tires having a tire size of 195/65R15 91Q were assembled to the specified rim of the rim size 15X6J, and the air pressure 210 kPa and the specified load according to JATMA specification are applied to the test tires. Also, the test tires were mounted on four wheels of a test vehicle, a front-engine front-drive (FF) sedan with an engine displacement of 1600 cc.

(1) In the evaluation relating to the braking performance on ice, the test vehicle was driven on a predetermined icy road surface and the braking distance from the traveling speed of 40 km/h is measured. The measurement results are expressed as index values and evaluated with the Conventional Example being assigned as the reference (100). In this evaluation, larger values are preferable.

(2) In the evaluation relating to the turning performance on ice, the test vehicle turns along a predetermined icy road surface along a circle with a radius of 6 m, and its traveling time is measured. The measurement results are expressed as index values and evaluated with the Conventional Example being assigned as the reference (100). In this evaluation, larger values are preferable.

(3) In the evaluation relating to the braking performance on snow, the test vehicle was driven on a predetermined snowy road surface and the braking distance from the traveling speed of 40 km/h was measured. The measurement results are expressed as index values and evaluated with the Conventional Example being assigned as the reference (100). In this evaluation, larger values are preferable.

(4) In the evaluation on steering stability performance on snow, the test vehicle travels on a predetermined snowy road surface at 60 km/h to 100 km/h. Then the test driver performed a sensory evaluation regarding steering while lane changing and cornering and stability while traveling forward. The evaluation is performed with index values in which the Conventional Example is assigned as the reference (100) and larger values are preferable.

The test tires of Examples 1 to 8 have the configurations of FIGS. 1 and 2. In addition, the tire ground contact width TW is 156 mm, and the groove width Wm of the outermost circumferential main grooves 21, 24 is 5.0 mm. In addition, the width W1 (see FIG. 3) of the inner second land portion 32 is 30 mm. Also, the groove width Ws of the circumferential narrow groove 321 of the inner second land portion 32 is 2.0 mm, and the ratio Hn/W1 is 0.50. In the test tire of Example 1, the lug grooves 322A, 322B of the inner second land portion 32 have a straight shape having a constant groove width Wg1 and do not have the narrow width portion 3222. On the other hand, in the test tire of Example 2, the lug grooves 322A, 322B of the inner second land portion 32 have the step shape illustrated in FIG. 4, and the groove width Wg1 of the wide portion 3221 thereof is 2.3 mm. The ratio L2/L1 of the arrangement intervals of the lug grooves 322A, 322B of the inner second land portion 32 is 0.50. Further, the sipe width of the sipe 4 is 0.4 mm. Also, the snow traction index STI_in of the inner second land portion 32 is 18, the collapse index δ_in is 3.0, and the groove area ratio Ain is 26%. Further, the depth Hd of the circumferential recessed portions 312, 352 of the shoulder land portions 31, 35 is 1.0 mm.

In the test tire of the Conventional Example, in the configuration of Example 1, the second lug groove 322B of the inner second land portion 32 in FIG. 3 has an open structure extending through the inner second land portion 32, and all the lug grooves 322A, 322B are inclined in the same direction with respect to the tire circumferential direction. In addition, the outer center circumferential main groove 23 has a straight shape and does not have the bent portion 231 (see FIG. 7).

As illustrated by the test results, it can be seen that in the test tires of Examples 1 to 8, the performance on snow and the performance on ice of the tire are compatible.

The invention claimed is:

1. A pneumatic tire, comprising:
   four or more circumferential main grooves extending in a tire circumferential direction; and
   five or more land portions defined by the circumferential main grooves; wherein
   left and right circumferential main grooves of the circumferential main grooves located at an outermost side in a tire lateral direction are defined as outermost circumferential main grooves, left and right land portions of the land portions located on a tire equatorial plane side and defined by the outermost circumferential main grooves are defined as second land portions;
   one of the second land portions comprises a circumferential narrow groove extending in the tire circumferential direction and a plurality of sets of first lug grooves and second lug grooves extending in the tire lateral direction and extending through the circumferential narrow groove;
   one end portion of the first lug groove opens to one edge portion of the one second land portion, and an other end portion terminates within the one second land portion;
   one end of the second lug groove opens to an other edge portion of the one second land portion, and an other end terminates within the one second land portion;
   the first lug groove and the second lug groove are alternately arranged in the tire circumferential direction;
   a circumferential main groove on a tire equatorial plane side defining the other second land portion has a bent shape with an amplitude in the tire lateral direction and comprises a bent portion with an acute angle of bending at an edge portion on a tire equatorial plane side;
   the other second land portion comprises a lug groove opening to a position facing the bent portion;
   the left and right land portions on the tire ground contact edge side defined by the right and left outermost circumferential main grooves are defined as shoulder land portions;
   at least one of the shoulder land portions comprises a plurality of lug grooves and a plurality of blocks defined by the lug grooves; and
   each block of the plurality of blocks defined by the lug grooves in the at least one of the shoulder land portions comprises a circumferential recessed portion that extends in the tire circumferential direction and opens to the lug groove at one end and terminates within the each block at an other end.

2. The pneumatic tire according to claim 1, wherein snow traction index STI_in in the tire circumferential direction of the one second land portion and snow traction index STI_out in the tire circumferential direction of the other second land portion have a relationship STI_out<STI_in.

3. The pneumatic tire according to claim 2, wherein the snow traction indexes STI_in and STI_out have a relationship 2≤STI_in−STI_out.

4. A pneumatic tire according to claim 1, wherein
   the one second land portion comprises a block defined by the circumferential narrow groove, the first lug groove, and the second lug groove, the other second land portion comprises a block defined by a plurality of lug grooves, and a collapse index $\delta\_in$ for the block of the one second land portion and a collapse index $\delta\_out$ for the block of the other second land portion have a relationship $\delta\_out < \delta\_in$.

5. The pneumatic tire according to claim 4, wherein the collapse indices $\delta\_in$ and $\delta\_out$ satisfy a condition of $1.15 \leq \delta\_in / \delta\_out$.

6. A pneumatic tire according to claim 1, wherein, out of left and right regions demarcated by the tire equatorial plane, a groove area ratio $A\_in$ for the one region comprising the one second land portion and a groove area ratio $A\_out$ for the other region comprising the other second land portion have a relationship $A\_in < A\_out$.

7. The pneumatic tire according to claim 6, wherein the groove area ratios $A\_in$ and $A\_out$ are in a range of $1\% \leq A\_out - A\_in$.

8. The pneumatic tire according to claim 1, wherein the block comprises a plurality of sipes extending in the tire lateral direction that do not intersect the circumferential recessed portion.

9. The pneumatic tire according to claim 8, wherein a depth Hd of the circumferential recessed portion and a depth Hs of the plurality of sipes satisfy a condition of $1.0 \text{ mm} \leq Hs - Hd$.

10. The pneumatic tire according to claim 1, wherein the one second land portion comprises a plurality of blocks defined by the circumferential narrow grooves, the first lug grooves, and the second lug grooves, and
    the blocks are arranged in a staggered manner in the tire circumferential direction.

11. The pneumatic tire according to claim 1, wherein the first lug groove and the second lug groove are inclined in opposite directions to each other with respect to the tire circumferential direction.

12. A pneumatic tire according to claim 1, wherein
    the land portion adjacent on the tire equatorial plane side to the other second land portion with the circumferential main groove therebetween comprising the bent portion is defined as the center land portion,
    the center land portion comprises a lug groove opening to the circumferential main groove at a position different from the bent portion, and
    the other second land portion comprises the first lug groove opening to a position facing the bent portion and a second lug groove opening to a position facing the lug groove of the center land portion.

13. A pneumatic tire according to claim 1, wherein
    the other second land portion comprises a block defined by a plurality of lug grooves, and
    the block comprises a circumferential narrow groove that extends in the tire circumferential direction and opens to the lug groove at one end and terminates within the block at an other end.

14. The pneumatic tire according to claim 1, further comprising a mounting direction indicating portion for designating mounting to a vehicle with the one second land portion on a vehicle width direction inside.

15. The pneumatic tire according to claim 1, wherein a depth of the circumferential recessed portion is within a range from 0.5 mm to 3.0 mm.

16. A pneumatic tire, comprising:
    four or more circumferential main grooves extending in a tire circumferential direction; and
    five or more land portions defined by the circumferential main grooves; wherein
    left and right circumferential main grooves of the circumferential main grooves located at an outermost side in a tire lateral direction are defined as outermost circumferential main grooves, left and right land portions of the land portions located on a tire equatorial plane side and defined by the outermost circumferential main grooves are defined as second land portions;
    one of the second land portions comprises a circumferential narrow groove extending in the tire circumferential direction and a plurality of sets of first lug grooves and second lug grooves extending in the tire lateral direction and extending through the circumferential narrow groove;
    one end portion of the first lug groove opens to one edge portion of the one second land portion, and an other end portion terminates within the one second land portion;
    one end of the second lug groove opens to an other edge portion of the one second land portion, and an other end terminates within the one second land portion;
    the first lug groove and the second lug groove are alternately arranged in the tire circumferential direction;
    a circumferential main groove on a tire equatorial plane side defining the other second land portion has a bent shape with an amplitude in the tire lateral direction and comprises a bent portion with an acute angle of bending at an edge portion on a tire equatorial plane side;
    the other second land portion comprises a lug groove opening to a position facing the bent portion;
    the land portion adjacent on the tire equatorial plane side to the other second land portion with the circumferential main groove therebetween comprising the bent portion is defined as the center land portion;
    the center land portion comprises a lug groove penetrating the center land portion and opening to the circumferential main groove at a position different from the bent portion; and
    the other second land portion comprises the first lug groove opening to a position facing the bent portion and a second lug groove opening to a position facing the lug groove of the center land portion.

17. A pneumatic tire, comprising:
    four or more circumferential main grooves extending in a tire circumferential direction; and
    five or more land portions defined by the circumferential main grooves; wherein
    left and right circumferential main grooves of the circumferential main grooves located at an outermost side in a tire lateral direction are defined as outermost circumferential main grooves, left and right land portions of the land portions located on a tire equatorial plane side and defined by the outermost circumferential main grooves are defined as second land portions;
    one of the second land portions comprises a circumferential narrow groove extending in the tire circumferential direction and a plurality of sets of first lug grooves and second lug grooves extending in the tire lateral direction and extending through the circumferential narrow groove;
    one end portion of the first lug groove opens to one edge portion of the one second land portion, and an other end portion terminates within the one second land portion;
    one end of the second lug groove opens to an other edge portion of the one second land portion, and an other end terminates within the one second land portion;
    the first lug groove and the second lug groove are alternately arranged in the tire circumferential direction;

a circumferential main groove on a tire equatorial plane side defining the other second land portion has a bent shape with an amplitude in the tire lateral direction and comprises a bent portion with an acute angle of bending at an edge portion on a tire equatorial plane side;

the other second land portion comprises a lug groove opening to a position facing the bent portion;

the other second land portion comprises a block defined by a plurality of lug grooves; and the block comprises a circumferential narrow groove that extends in the tire circumferential direction and opens to the lug groove at one end and terminates within the block at an other end.

18. The pneumatic tire according to claim 17, wherein the lug groove of the other second land portion is inclined in one direction in the tire circumferential direction toward an outside in the tire width direction, and a direction from one end of the circumferential groove toward other end is the same as an inclination direction of the lug groove.

* * * * *